United States Patent
Inoue et al.

(10) Patent No.: US 10,343,251 B2
(45) Date of Patent: Jul. 9, 2019

(54) CAM GRINDING MACHINE AND CAM GRINDING METHOD

(71) Applicant: JTEKT CORPORATION, Osaka-shi (JP)

(72) Inventors: Masaharu Inoue, Obu (JP); Yoshihiro Mizutani, Kitanagoya (JP); Satoshi Abeta, Chita (JP)

(73) Assignee: JTEKT CORPORATION, Osaka-shi (JP)

( * ) Notice: Subject to any disclaimer, the term of this patent is extended or adjusted under 35 U.S.C. 154(b) by 259 days.

(21) Appl. No.: 15/466,080

(22) Filed: Mar. 22, 2017

(65) Prior Publication Data
US 2017/0274492 A1    Sep. 28, 2017

(30) Foreign Application Priority Data

Mar. 23, 2016  (JP) .................. 2016-058015

(51) Int. Cl.
*B24B 19/12* (2006.01)
*F16H 53/02* (2006.01)

(52) U.S. Cl.
CPC ......... *B24B 19/125* (2013.01); *F16H 53/025* (2013.01)

(58) Field of Classification Search
CPC ...... B24B 19/125; B24B 19/12; F16H 53/025
USPC .................................. 451/5, 49, 51
See application file for complete search history.

(56) References Cited

U.S. PATENT DOCUMENTS

| | | | | |
|---|---|---|---|---|
| 3,864,879 A | * | 2/1975 | Naismith | B24B 17/026 451/239 |
| 4,346,535 A | * | 8/1982 | Asano | B23B 31/32 279/139 |
| 4,527,356 A | * | 7/1985 | Ozone | B24B 19/12 409/114 |
| 4,885,874 A | * | 12/1989 | Wedeniwski | B24B 19/125 451/5 |
| 5,251,405 A | * | 10/1993 | Clauss | B24B 19/125 451/25 |

(Continued)

FOREIGN PATENT DOCUMENTS

| | | |
|---|---|---|
| DE | 103 33 916 B4 | 10/2010 |
| JP | 4-13560 | 1/1992 |

OTHER PUBLICATIONS

U.S. Appl. No. 15/350,680, filed Nov. 14, 2016, Yoshihiro Mizutani, et al.

(Continued)

*Primary Examiner* — George B Nguyen
(74) *Attorney, Agent, or Firm* — Oblon, McClelland, Maier & Neustadt, L.L.P.

(57) ABSTRACT

In a cam grinding method, a common surface of a first cam and a second cam is acquired in a common surface setting step. In a first common surface grinding step performed after a first cam grinding step, traverse movement of a grinding wheel is performed such that the grinding wheel is aligned with an area from the first cam to the second cam while the first cam and the second cam are rotated, and the common surface is ground. In a second common surface grinding step performed after a second cam grinding step, traverse movement of the grinding wheel is performed such that the grinding wheel is aligned with an area from the second cam to the first cam while the first cam and the second cam are rotated, and the common surface is ground.

6 Claims, 23 Drawing Sheets

(56) References Cited

U.S. PATENT DOCUMENTS

| | | | | |
|---|---|---|---|---|
| 5,392,566 A * | 2/1995 | Wedeniwski | B24B 19/12 | 451/11 |
| 5,472,368 A * | 12/1995 | Zollig | B24B 19/12 | 451/62 |
| 5,899,797 A * | 5/1999 | Junker | B24B 19/12 | 451/242 |
| 5,975,995 A * | 11/1999 | Hykes | B24B 19/12 | 451/10 |
| 6,711,829 B2 * | 3/2004 | Sano | B24B 1/00 | 33/543 |
| 8,172,644 B2 * | 5/2012 | Mizutani | B24B 5/42 | 451/11 |
| 2009/0247049 A1 * | 10/2009 | Inoue | B23Q 17/20 | 451/5 |
| 2017/0144264 A1 * | 5/2017 | Mizutani | B24B 17/025 | |
| 2017/0157730 A1 * | 6/2017 | Mizutani | B24B 1/00 | |
| 2017/0274492 A1 * | 9/2017 | Inoue | F16H 53/025 | |

OTHER PUBLICATIONS

U.S. Appl. No. 15/365,345, filed Nov. 30, 2016, Yoshihiro Mizutani, et al.

* cited by examiner

CAM GRINDING MACHINE AND CAM GRINDING METHOD

INCORPORATION BY REFERENCE

The disclosure of Japanese Patent Application No. 2016-058015 filed on Mar. 23, 2016 including the specification, drawings and abstract, is incorporated herein by reference in its entirety.

BACKGROUND OF THE INVENTION

1. Field of the Invention

The invention relates to a cam grinding machine and a cam grinding method.

2. Description of the Related Art

Through valve opening actuation, air is taken into a cylinder of an internal combustion engine and exhaust gas is discharged from the cylinder of the internal combustion engine. The valve opening actuation is performed by actuating rotary cams.

From a viewpoint of, for example, the enhancement of an output from the internal combustion engine, valve opening actuation control is performed to vary the mode of valve opening actuation depending on whether the internal combustion engine is operating at a low engine speed or is operating at a high engine speed.

An example of a control apparatus that performs such valve opening actuation control is described in DE 103 33 916. A first cam for low-speed use and a second cam for high-speed use are provided as cams for actuating a valve. The first cam or the second cam is selected as appropriate based on the engine speed of an internal combustion engine, and valve opening control is performed. In this case, switching and selection between the first cam and the second cam is performed by moving a tappet of the valve relative to the first cam and the second cam in the axial direction in a contact state.

FIGS. 21 to 23 are each a schematic view illustrating the positional relationship between a first cam 112 for low-speed use and a second cam 114 for high-speed use. As can be seen from the drawings, usually, the maximum lift amount of the first cam 112 for low-speed use is set smaller, and the maximum lift amount of the second cam 114 for high-speed use is set larger than that of the first cam 112. The phases of the cams 112, 114 in the rotation direction (counterclockwise direction in FIG. 21) are set such that the phase of the second cam 114 for high-speed use is advanced relative to the phase of the first cam 112 for low-speed use, that is, the valve opening actuation of the second cam 114 for high-speed use is performed earlier than the valve opening actuation of the first cam 112 for low-speed use. Thus, as illustrated in FIG. 21, the phase of the second cam 114 for high-speed use at the maximum lift amount and the phase of the first cam 112 for low-speed use at the maximum lift amount are offset from each other.

As illustrated in FIG. 22 and FIG. 23, the first cam 112 for low-speed use and the second cam 114 for high-speed use are provided adjacent to each other in the axial direction, that is, the first cam 112 and the second cam 114 are provided in combination as a composite cam 110. In this case, each of the first cam 112 for low-speed use and the second cam 114 for high-speed use has a base circular portion having a constant radius r from the cam rotation axis. The base circular portion is a portion of each of the first cam 112 and the second cam 114, other than a portion thereof at which the cam profile varies so as to vary the lift amount based on the phase. A certain angular range in which the base circular portion of the first cam 112 and the base circular portion of the second cam 114 overlap with each other is defined as a common surface C. Within the range of the common surface C, the tappet is moved relative to the first cam 112 and the second cam 114 in a contact state.

Grinding of the composite cam 110 including the first cam 112 for low-speed use and the second cam 114 for high-speed use is usually performed by a grinding wheel T (refer to FIG. 22 and FIG. 23) in a cam grinding machine. A grinding method described in Japanese Patent Application Publication No. 04-13560 (JP 04-13560 A) may be applied to the grinding of the composite cam 110, so that plunge grinding of one of the first cam 112 and the second cam 114 is performed, and then plunge grinding of the other one of the first cam 112 and the second cam 114 is performed.

For example, in a case illustrated in FIG. 22 and FIG. 23, grinding of the first cam 112 for low-speed use is performed first, and then grinding of the second cam 114 for high-speed use is performed. In this case, the grinding of the first cam 112 is performed by the grinding wheel T bused on preset cam lift data about the first cam 112 for low-speed use. Through the grinding of the first cam 112, an unground portion Wd is formed in a portion of the first cam 112, which is on the second cam 114-side. Then, the grinding wheel T is moved to a position corresponding to the second cam 114 for high-speed use, and then the grinding of the second cam 114 is performed by the grinding wheel T based on preset cam lift data about the second cam 114 for high-speed use. Through the grinding of the second cam 114, an unground portion We is formed in a portion of the second cam 114, which is on the first cam 112-side. In this way, the grinding of the composite cam 110 is performed by the cam grinding machine.

Through the grinding of the composite cam 110 performed by the grinding wheel T of the cam grinding machine, the unground portions Wd, We, which are portions left unground, are formed at a boundary Wp between the first cam 112 and the second cam 114 within the range of the common surface C of the first cam 112 and the second cam 114, as illustrated in FIG. 23. The unground portions Wd, We illustrated in FIG. 22 and FIG. 23 are exaggeratingly illustrated for easy understanding. Actually, the unground portions Wd, We are each several micro meters in size.

When the unground portions Wd, We are present at the boundary Wp between the first cam 112 and the second cam 114 within the range of the common surface C, the tappet needs to climb over the unground portions Wd, We while relatively moving between the first cam 112 and the second cam 114. This hinders the smooth actuation, thereby affecting the valve opening control. Thus, truing of the grinding wheel T needs to be performed at shorter time intervals so as to be performed more frequently.

The problem caused by the unground portions Wd, We will be described in detail. As illustrated in FIG. 22 and FIG. 23, the width of the grinding wheel T in the axial direction is usually greater than the width of each of the first cam 112 for low-speed use and the second cam 114 for high-speed use in the axial direction. As the grinding wheel T performs grinding of a cam, which is a workpiece, so-called shear droop is generated at both end edges Ta, Tb on a grinding face side of the grinding wheel T. That is, abrasion proceeds more quickly at the both end edges Ta, Tb than at a central portion of the grinding wheel T, so that the shear droop is generated.

In view of this, as illustrated in FIG. 22, when the plunge grinding of the first cam 112 for low-speed use is performed, the grinding wheel T is positioned such that a right end Tg of the grinding wheel T is aligned with the boundary Wp between the first cam 112 and the second cam 114. With this arrangement, a left end Tf of the grinding wheel T is positioned outward of a left end of the first cam 112. Thus, the shear droop at a left end edge Ta of the grinding wheel T does not affect the grinding of the first cam 112. However, the shear droop at a right end edge Tb of the grinding wheel T affects the grinding of the first cam 112 at the boundary Wp between the first cam 112 and the second cam 114. As a result, the unground portion Wd is left. A black-filled portion in FIG. 22 is the unground portion Wd. While grinding allowances of the first cam 112 and the second cam 114 are indicated by imaginary lines in FIG. 22 and FIG. 23, the grinding allowances are also exaggeratingly illustrated for easy understanding.

After the grinding of the first cam 112 is finished, the grinding wheel T is relatively moved to a position corresponding to the second cam 114, and the plunge grinding of the second cam 114 is performed by the grinding wheel T, as illustrated in FIG. 23. In the plunge grinding, the grinding wheel T is positioned such that the left end edge Ta thereof is aligned with the boundary Wp between the first cam 112 and the second cam 114. With this arrangement, the right end Tg of the grinding wheel T is positioned outward of a right end of the second cam 114. Thus, the shear droop at the right end edge Tb of the grinding wheel T does not affect the grinding of the second cam 114. However, the shear droop at the left end edge Ta of the grinding wheel T affects the grinding of the second cam 114 at the boundary Wp between the first cam 112 and the second cam 114. As a result, the unground portion We is left. The unground portion We is illustrated as a black-filled portion in FIG. 23, together with the unground portion Wd of the first cam 112 that has been described with reference to FIG. 22. The unground portion We, together with the unground portion Wd, is left at a position on the boundary Wp between the first cam 112 and the second cam 114.

SUMMARY OF THE INVENTION

One object of the invention is to provide a cam grinding machine and a cam grinding method that make it possible to grind a first cam and a second cam that differ in cam lift data from each other, while removing unground portions formed at a boundary between the first cam and the second cam on a common surface of the first cam and the second cam.

An aspect of the invention relates to a cam grinding machine configured to grind a composite cam. The composite cam includes a first cam having a lift amount that varies, the lift amount being is a distance from a rotation axis of the composite cam to an outer peripheral surface of the first cam, and a second cam having a lift amount that varies, the lift amount being a distance from the rotation axis of the composite cam to an outer peripheral surface of the second cam. The first cam and the second cam are coaxially disposed adjacent to each other in an axial direction. The first cam and the second cam have shapes corresponding respectively to first cam lift data and second cam lift data that are different from each other.

The cam grinding machine includes: a bed; a workpiece rotating device mounted on the bed, the workpiece rotating device being configured to control a phase of the composite cam about the rotation axis to rotationally drive the composite cam; a grinding wheel device mounded on the bed, the grinding wheel device including a rotary grinding wheel; a traverse moving device configured to control a position of the grinding wheel relative to the composite cam in the axial direction to perform traverse movement of the grinding wheel relative to the composite cam; a plunge moving device configured to control a position of the grinding wheel relative to the composite cam in a direction intersecting with the axial direction to perform plunge movement of the grinding wheel relative to the composite cam; and a controller configured to control the workpiece rotating device, the traverse moving device, and the plunge moving device.

The controller further includes: a common surface setting unit configured to acquire and store a phase range of a common surface in which the lift amount of the first cam and the lift amount of the second cam are equal to each other, based on the first cam lift data in which the lift amount at each phase of the first cam is set and the second cam lift data in which the lift amount at each phase of the second cam is set; a first cam grinding unit configured control the workpiece rotating device and the plunge moving device to grind the first cam; a first common surface grinding unit configured to control the workpiece rotating device and the traverse moving device to move the grinding wheel from the common surface of the first cam to the common surface of the second cam and to grind the common surface; a second cam grinding unit configured to control the workpiece rotating device and the plunge moving device to grind the second cam; a second common surface grinding unit configured to control the workpiece rotating device and the traverse moving device to move the grinding wheel from the common surface of the second cam to the common surface of the first cam and to grind the common surface; and an overall operation unit configured to set actuations such that the first cam grinding unit, the first common surface grinding unit, the second cam grinding unit, and the second common surface grinding unit are actuated in this order.

With the cam grinding machine according to the aspect described above, an angular range of the common surface of the first cam and the second cam is determined by the common surface setting unit of the controller. The angular range is acquired based on the first cam lift data and the second cam lift data. The first cam grinding unit controls the workpiece rotating device and the plunge moving device to grind a portion of the first cam other than the common surface thereof based on the first cam lift data, and then the first common surface grinding unit controls the workpiece rotating device and the traverse moving device to move the grinding wheel from the common surface of the first cam to the common surface of the second cam while rotating the first cam and the second cam and to grind the common surface.

Subsequently, the second cam grinding unit controls the workpiece rotating device and the plunge moving device to grind a portion of the second cam other than the common surface thereof based on the second cam lift data, and then the second common surface grinding unit controls the workpiece rotating device and the traverse moving device to move the grinding wheel from the common surface of the second cam to the common surface of the first cam while rotating the first cam and the second cam and to grind the common surface. In this way, with the first common surface grinding unit, grinding from the first cam to the second cam across the boundary is performed, and with the second common surface grinding unit, grinding from the second cam to the first cam across the boundary is performed. As a result, no unground portion is formed at the boundary on the common surface of the first cam and the second cam.

The first cam grinding unit performs traverse movement of the grinding wheel, which has finished the grinding of the portion of the first cam other than the common surface, without moving the grinding wheel forward or backward, and allows the grinding wheel to grind the common surface of the first cam and the common surface of the second cam. Thus, a stepped portion in a plunge direction can be prevented from being formed in a portion between the portion of the first cam other than the common surface thereof and the common surface thereof. That is, when the grinding wheel is temporarily moved backward after the grinding of the first cam by the first cam grinding unit is finished, traverse movement of the grinding wheel is performed to move it to a boundary position, and then the grinding wheel is moved forward to perform plunge grinding, an error in a forward position of the grinding wheel may occur to form a stepped portion in the plunge direction in a portion between the portion of the first cam other than the common surface thereof and the common surface thereof.

In addition, the second cam grinding unit performs traverse movement of the grinding wheel, which has finished the grinding of the portion of the second cam other than the common surface, without moving the grinding wheel forward or backward, and allows the grinding wheel to grind the common surface of the second cam and the common surface of the second cam. Thus, a stepped portion in a plunge direction can be prevented from being formed in a portion between the portion of the second cam other than the common surface thereof and the common surface thereof. That is, when the grinding wheel is temporarily moved backward after the grinding of the second cam by the second cam grinding unit is finished, traverse movement of the grinding wheel is performed to move it to a boundary position, and then the grinding wheel is moved forward to perform plunge grinding, an error in a forward position of the grinding wheel may occur to form a stepped portion in the plunge direction in a portion between the portion of the second cam other than the common surface thereof and the common surface thereof.

Another aspect of the invention relates to a cam grinding method for grinding a composite cam. The composite cam includes a first cam having a lift amount that varies, the lift amount being is a distance from a rotation axis of the composite cam to an outer peripheral surface of the first cam, and a second cam having a lift amount that varies, the lift amount being a distance from the rotation axis of the composite cam to an outer peripheral surface of the second cam. The first cam and the second cam are coaxially disposed adjacent to each other in an axial direction. The first cam and the second cam having shapes correspond respectively to first cam lift data and second cam lift data that are different from each other.

The cam grinding method includes: a common surface setting step of acquiring and storing a phase range of a common surface in which the lift amount of the first cam and the lift amount of the second cam are equal to each other, based on the first cam lift data in which the lift amount at each phase of the first cam is set and the second cam lift data in which the lift amount at each phase of the second cam is set; a first cam grinding step of grinding the first cam through plunge grinding, using a grinding wheel, based on the first cam lift data; a first common surface grinding step of moving the grinding wheel from the common surface of the first cam to the common surface of the second cam and grinding the common surface; a second cam grinding step of grinding the second cam through plunge grinding, using the grinding wheel, based on the second cam lift data; and a second common surface grinding step of moving the grinding wheel from the common surface of the second cam to the common surface of the first cam and grinding the common surface. According to the cam grinding method, the common surface setting step, the first cam grinding step, the first common surface grinding step, the second cam grinding step, and the second common surface grinding step are performed in this order.

With the cam grinding method according to the above aspect, no unground portion is formed at a boundary between the common surfaces of the first cam and the second cam that are different in an lift amount as well as in a phase, and truing of the grinding wheel need not be frequently performed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
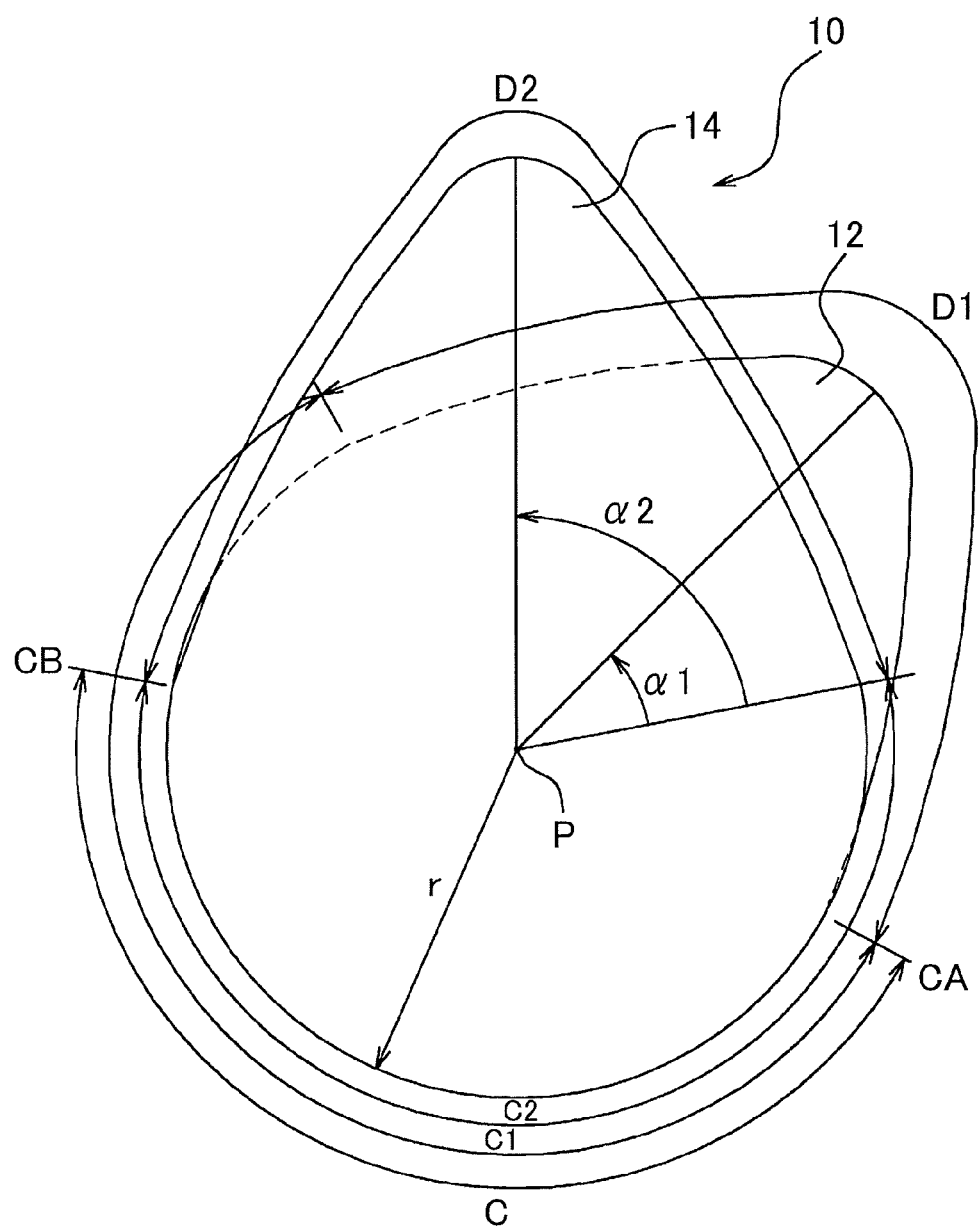
FIG. 1 is a front view of a composite cam according to an embodiment of the invention, as viewed from the direction of a rotation axis.
Figure 2:
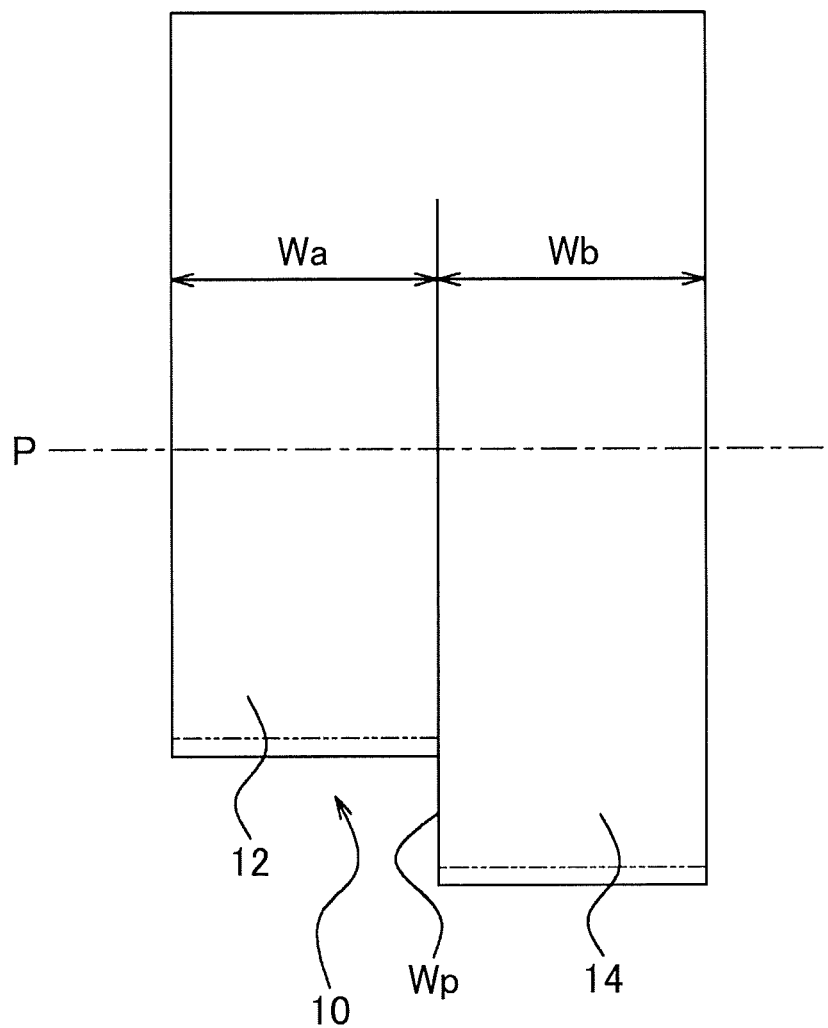
FIG. 2 is a side view of the composite cam according to the embodiment of the invention, as viewed from a direction perpendicular to the rotation axis.

Hereinafter, embodiments of the invention will be described with reference to the accompanying drawings. First, a composite cam 10 according to a present embodiment will be described. FIG. 1 is a front view of the composite cam 10 as viewed from the direction of a rotation axis P. FIG. 2 is a side view of a first cam 12 and a second cam 14 that constitute the composite cam 10, as viewed from a direction perpendicular to the rotation axis P. In FIG. 2, each of the first cam 12 and the second cam 14 is illustrated by the maximum lift amount thereof.

As illustrated in FIG. 2, the composite cam 10 according to the present embodiment includes the first cam 12 and the second cam 14 that are disposed adjacent to each other in the direction of the rotation axis P. In the present embodiment, the first cam 12 is a cam for low-speed use, and the second cam 14 is a cam for high-speed use. The maximum lift amount of the first cam 12 for low-speed use is smaller than the maximum lift amount of the second cam 14 for high-speed use. As illustrated in FIG. 2, the first cam 12 for low-speed use and the second cam 14 for high-speed use have the same width in the direction of the rotation axis P. That is, a width Wa of the first cam 12 is equal to a width Wb of the second cam 14.

As illustrated in FIG. 1, the phase of the first cam 12 for low-speed use at the maximum lift amount and the phase of the second cam 14 for high-speed use at the maximum lift amount are offset from each other. The phase of the second cam 14 for high-speed use is advanced relative the first cam 12 for low-speed use in a rotation direction of an internal combustion engine (a counterclockwise direction in FIG. 1). Thus, in the internal combustion engine, the valve opening actuation of the second cam 14 is performed earlier that the valve opening actuation of the first cam 12. In the present embodiment, the phase of the second cam 14 for high-speed use at the maximum lift amount and the phase of the first cam 12 for low-speed use at the maximum lift amount are offset from each other. As viewed from the direction of the rotation axis P, the cam profile of the first cam 12 sticks out from the cam profile of the second cam 14, and the cam profile of the second cam 14 sticks out from the cam profile of the first cam 12. Even when the cam profile of one of the first cam 12 and the second cam 14 is within the cam profile of the other one of the first cam 12 and the second cam 14 without sticking out, the phase of the first cam 12 at the maximum lift amount and the phase of the second cam 14 at the maximum lift amount may be offset from each other. In this specification, the lift amount means a distance from the rotation axis P to the contour of each of the first cam 12 and the second cam 14. The boundary between the first cam 12 and the second cam 14 will be denoted by a reference symbol Wp.

As illustrated in FIG. 1, the cam contour shape of each of the first cam 12 and the second cam 14 is defined by a radius r that is a distance from the rotation axis P to the cam contour surface of a corresponding one of the first cam 12 and the second cam 14. That is, the cam contour shape is composed of a base circular surface at which the lift amount is kept constant regardless of phase variations, and a profile variation surface that is a portion other than the base circular surface and at which the lift amount varies based on phase variations. In FIG. 1, a first base circular surface of the first cam 12 is denoted by a reference symbol C1, and a first profile variation surface thereof is denoted by a reference symbol D1. Likewise, a second base circular surface of the second cam 14 is denoted by a reference symbol C2, and a second profile variation surface thereof is denoted by a reference symbol D2. Because the first cam 12 and the second cam 14 differ from each other in the maximum lift amount and the phase at the time of maximum lift, the phase range of the first base circular surface C1 and the phase range of the second base circular surface C2 are offset from each other. The common surface where the phase of the first base circular surface C1 overlaps with the phase of the second base circular surface C2 is illustrated as a common surface C in FIG. 1.

Figure 3:
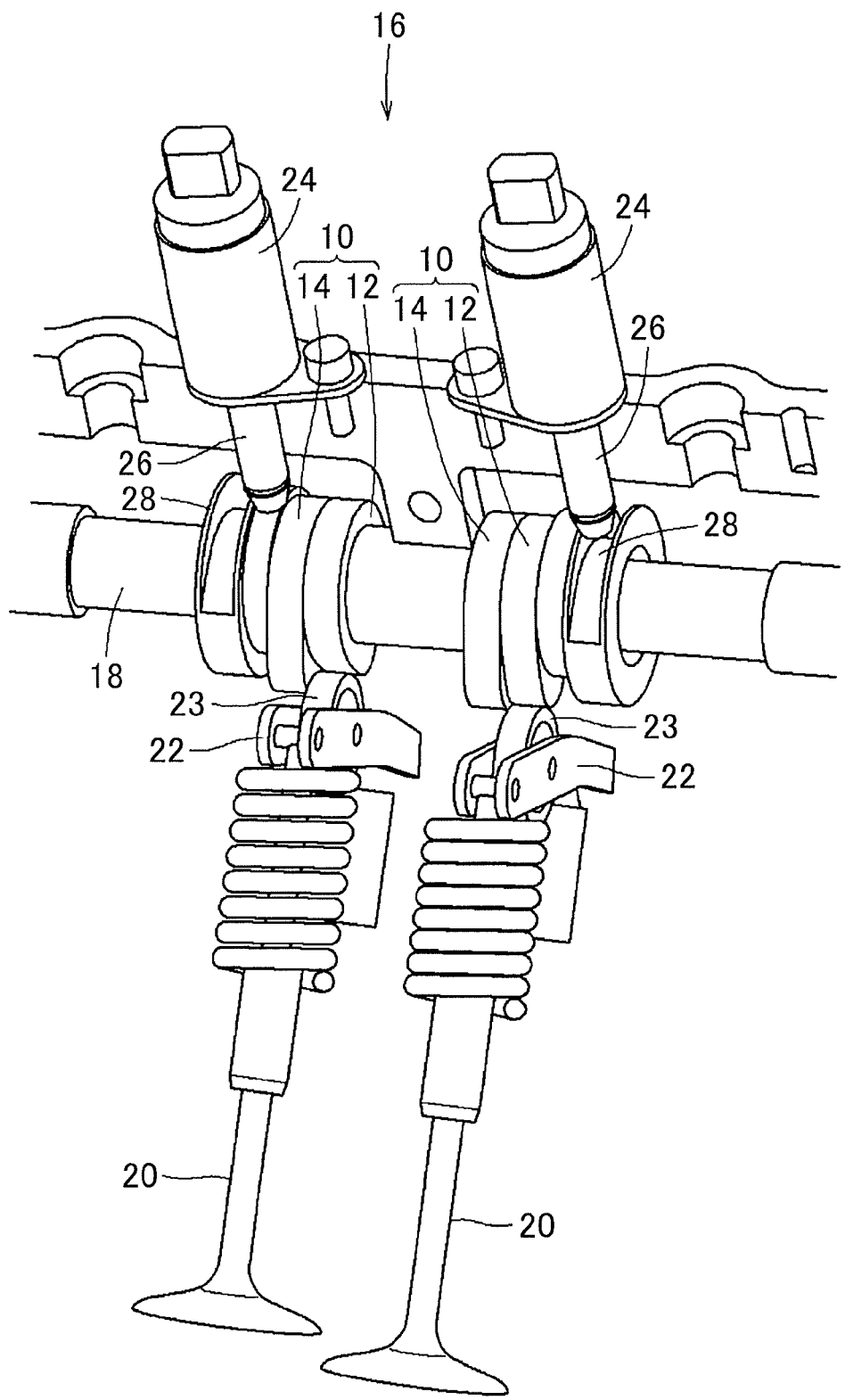
FIG. 3 is a perspective view of a cam control mechanism including the composite cam according to the embodiment of the invention.

FIG. 3 illustrates an embodiment indicating an example of a cam control mechanism 16 configured to selectively control the first cam 12 and the second cam 14 on a camshaft 18 provided with the composite cam 10. The camshaft 18 is provided with the first cam 12 and the second cam 14, and the first cam 12 and the second cam 14 are provided for the corresponding valve 20. The first cam 12 and the second cam 14 are integral with each other, thereby constituting the composite cam 10. In the present embodiment, each of the two composite cams 10 can rotate together with the camshaft 18 in an integrated manner, and can move in the axial direction.

The valve 20 is moved up and down through an oscillation motion of a tappet 22. The tappet 22 is selectively brought into contact with the first cam 12 and the second cam 14, and is thus oscillated by a corresponding one of the first cam 12 and the second cam 14. Specifically, the tappet 22 is brought into contact with the first cam 12 or the second cam 14 when a tappet roller 23 of the tappet 22 is brought into contact with the first cam 12 or the second cam 14. The tappet 22 is selectively brought into contact with the first cam 12 and the second cam 14 when a pin 26 of an actuator 24, such as an electromagnetic solenoid, is engaged with a spirally-grooved body 28 that is provided next to the composite cam 10 so as to be integral with the composite cam 10. The spirally-grooved body 28 has, in its outer peripheral surface, a spiral groove that shifts in the direction of the rotation axis P during rotation. The pin 26 is engaged with the spiral groove, so that the two composite cams 10 are moved in the axial direction due to the rotation of the camshaft 18 and the composite cams 10. The spiral grooves of the right and left spirally-grooved bodies 28 extend in the same direction. For example, when the pin 26 is engaged with the spiral groove of one of the spirally-grooved bodies 28, the composite cam 10 is moved rightward. When the pin 26 is engaged with the spiral groove of the other one of the spirally-grooved bodies 28, the composite cam 10 is moved rightward. Thus, the position of the cam that comes into contact with the tappet 22 is switched. The switching actuation by the actuator 24 is performed when the tappet 22 is in contact with the common surface C of the first cam 12 and the second cam 14.

Figure 4:
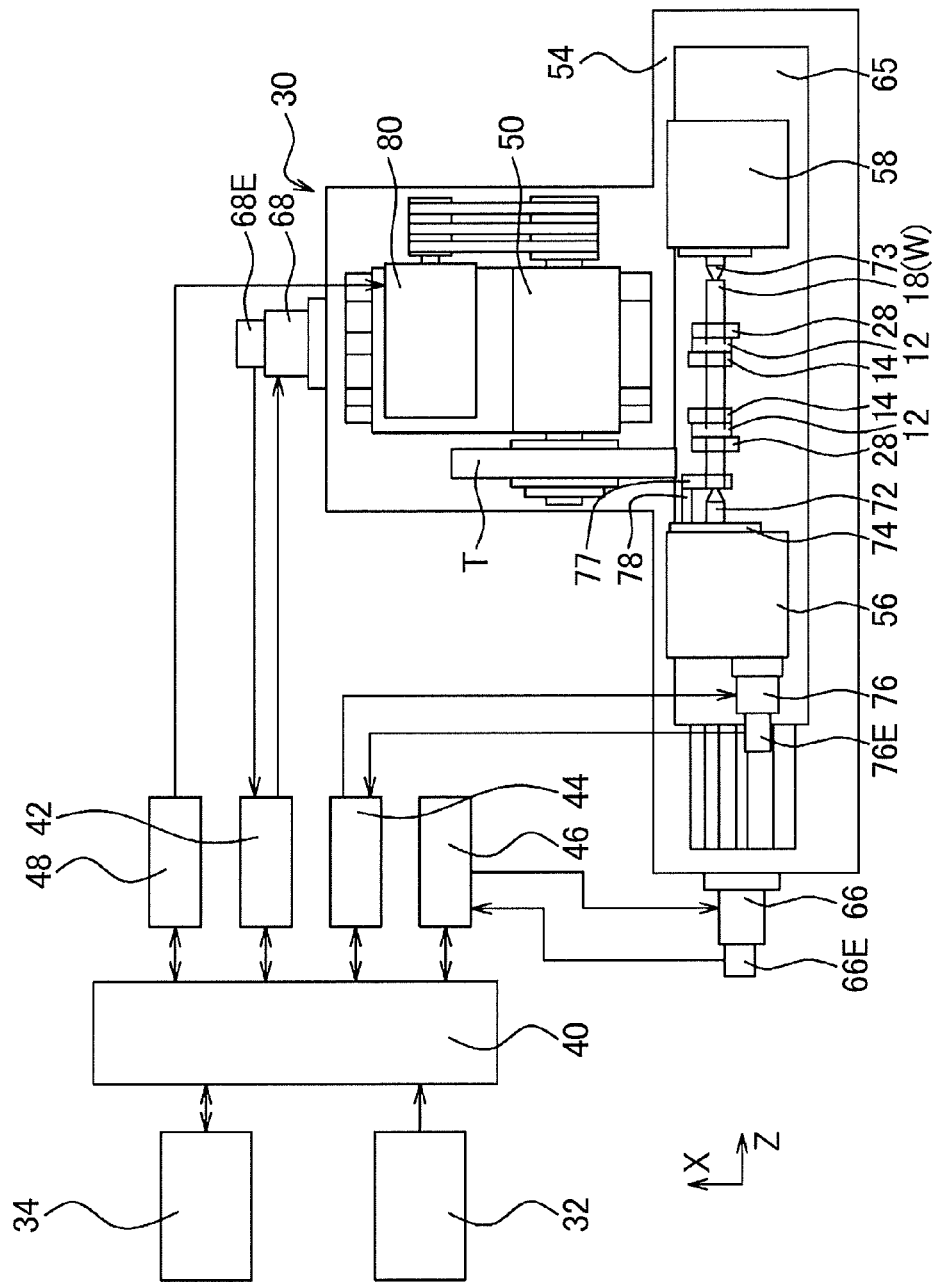
FIG. 4 is a plan view of a cam grinding machine according to the embodiment of the invention.
Figure 5:
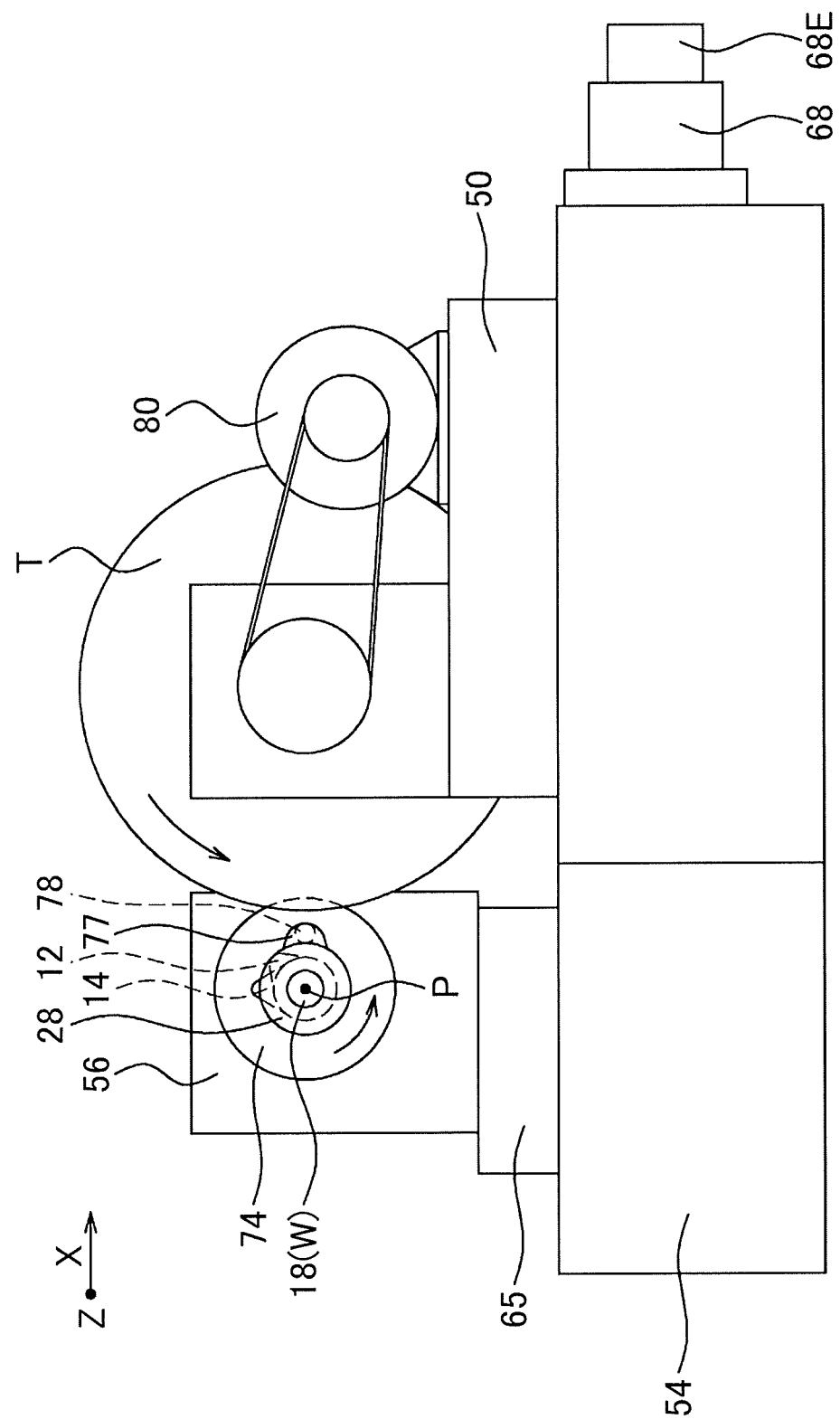
FIG. 5 is a right side view of the cam grinding machine according to the embodiment of the invention.

Next, a cam grinding machine 30 will be described with reference to FIG. 4 and FIG. 5. FIG. 4 is a plan view of the cam grinding machine 30, and FIG. 5 is a right side view of the cam grinding machine 30. A tailstock 58 is illustrated in FIG. 4, and illustration of the tailstock 58 is omitted in FIG.

5. An X-axis direction and a Z-axis direction in each of FIG. 4 and FIG. 5 indicate horizontal directions that are perpendicular to each other.

The cam grinding machine 30 according to the present embodiment is configured such that the camshaft 18 provided with the composite cams 10 is rotatably supported and the camshaft 18a is ground by a grinding wheel T having a cylindrical shape. The camshaft 18 is a workpiece W. As illustrated in FIG. 4, the cam grinding machine 30 includes a monitor-equipped input device 32, a storage device 34, a numerical control unit 40, drive units 42, 44, 46, 48, a bed 54, a grinding wheel rest 50, a main spindle device 56, a tailstock 58, and a workpiece table 65.

Cam lift data for specifying the shape of the composite cam 10 to be ground can be read through a worker's operation using the monitor-equipped input device 32. In the present embodiment, first cam lift data indicating the cam contour shape of the first cam 12 illustrated in FIG. 1, and second cam lift data indicating the cam contour shape of the second cam 14 illustrated in FIG. 1 are read. Each of the first cam lift data and the second cam lift data includes a plurality of phases and a plurality of lift amounts. That is, the first cam lift data includes a plurality of phases set at equal intervals from zero degrees to 360 degrees of the first cam 12, and a plurality of cam lift amounts of the first cam 12 corresponding to the phases. Further, the second cam lift data includes a plurality of phases set at equal intervals from zero degrees to 360 degrees of the second cam 14, and a plurality of cam lift amounts of the second cam 14 corresponding to the phases. Phase data for specifying the phase of the first cam 12 and phase data for specifying the phase of the second cam 14 are read through a worker's operation using the monitor-equipped input device 32. In the present embodiment, an angle $\alpha 1$ from a reference phase of the first cam 12 to a phase at the maximum lift of the first cam 12 and an angle $\alpha 2$ from a reference phase of the second cam 14 to a phase at the maximum lift of the second cam 14, illustrated in FIG. 1, are read as the phase data. The reference phase of the first cam 12 and the reference phase of the second cam 14 are actually the same phase, but are different from each other in the first cam lift data and the second cam lift data.

The phases in the first cam lift data and the phases in the second cam lift data are offset from each other, and thus a work for aligning the phases in the data is required. The work will be described below. A phase Q1 at the maximum lift is found out from the first cam lift data. Because an angle from the reference phase of the first cam 12 to the phase at the maximum lift of the first cam 12 is $\alpha 1$, $\Delta Q1$ is acquired according to an equation, $\Delta Q1 = Q1 - \alpha 1$, and $\Delta Q1$ is subtracted from each phase in the first cam lift data. When a phase becomes negative through the subtraction, 360 degrees is added to the phase. When a phase exceeds 360 degrees through the subtraction, 360 degrees is subtracted from the phase. As a result, Q is corrected so as to satisfy an equation, $0 \leq Q \leq 360$. Thus, a corrected first cam lift data with reference to the reference phase is acquired.

A phase Q2 at the maximum lift is found out from the second cam lift data. Because an angle from the reference phase of the second cam 14 to the phase at the maximum lift of the second cam 14 is $\alpha 2$, $\Delta Q2$ is acquired according to an equation, $\Delta Q2 = Q2 - \alpha 2$, and $\Delta Q2$ is subtracted from each phase in the second cam lift data. When a phase becomes negative through the subtraction, 360 degrees is added to the phase. When a phase exceeds 360 degrees through the subtraction, 360 degrees is subtracted from the phase. As a result, Q is corrected so as to satisfy an equation, $0 \leq Q \leq 360$. Thus, a corrected second cam lift data with reference to the reference phase is acquired. As a result, the phases in the corrected first cam lift data and the phases in the corrected second cam lift data are aligned with each other. The corrected first cam lift data and the corrected second cam lift data that have the phases aligned with each other are used in a flow of a program of a common surface setting process in FIG. 8.

Specifically, a worker inputs the following data into the monitor-equipped input device 32:
  (a) Width Wa of the first cam 12;
  (b) Width Wb of the second cam 14;
  (c) Width Td and diameter H of the grinding wheel T;
  (d) Rotation speed Ma of the grinding wheel T, rotation speed Na of a main spindle 74, advancing distance Ja of the grinding wheel T, the number of rotations Ka of the main spindle 74, and plunge speed Ua of the grinding wheel T, at the time of idle grinding;
  (e) Rotation speed Mb of the grinding wheel T, rotation speed Nb of the main spindle 74, advancing distance Jb of the grinding wheel T, the number of rotations Kb of the main spindle 74, and plunge speed Ub of the grinding wheel T, at the time of rough grinding;
  (f) Rotation speed Mc of the grinding wheel T, rotation speed Nc of the main spindle 74, advancing distance Jc of the grinding wheel T, the number of rotations Kc of the main spindle 74, and plunge speed Uc of the grinding wheel T, at the time of precision grinding;
  (g) Rotation speed Md of the grinding wheel T, rotation speed Nd of the main spindle 74, advancing distance Jd of the grinding wheel T, the number of rotations Kd of the main spindle 74, and plunge speed Ud of the grinding wheel T, at the time of fine grinding; and
  (h) Rotation speed Me of the grinding wheel T, rotation speed Ne of the main spindle 74, and the number of rotations Ke of the main spindle 74, at the time of spark-out.

Figure 7:
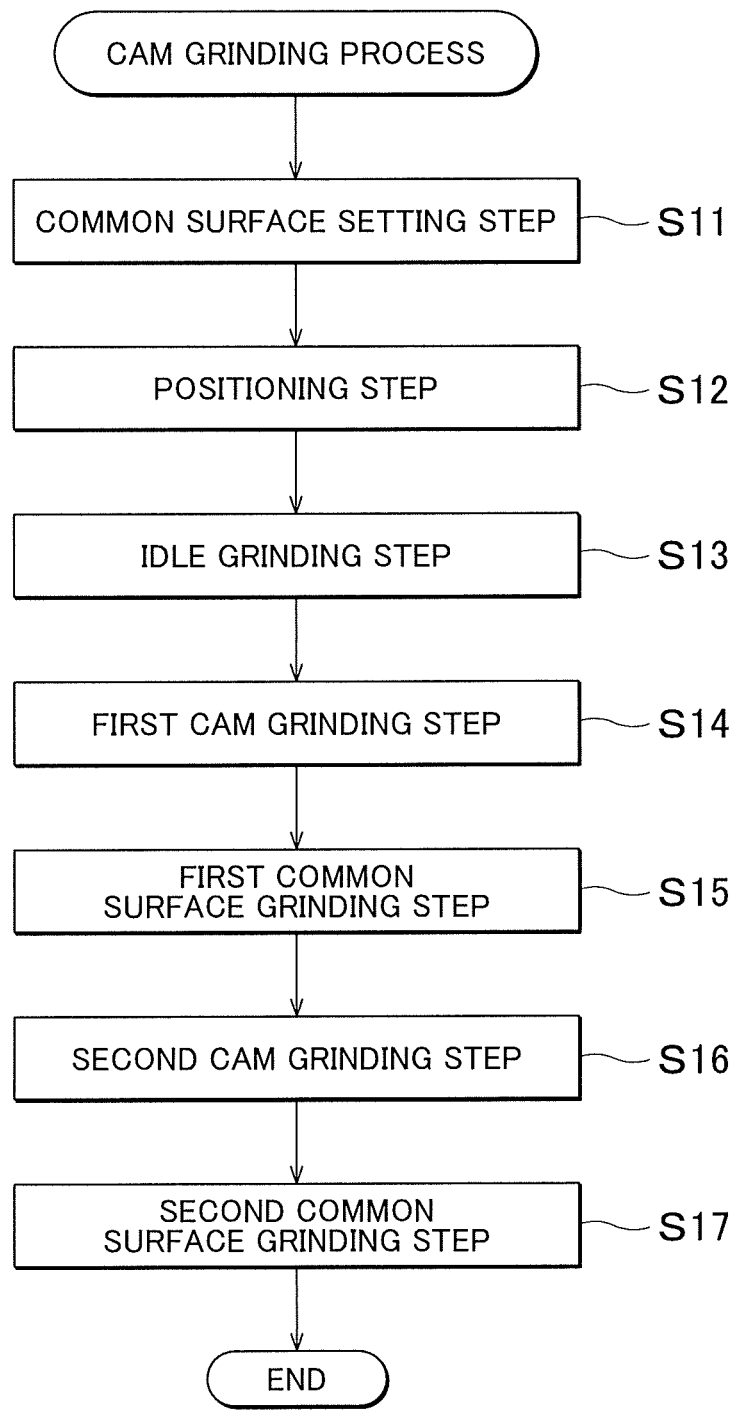
FIG. 7 is a flowchart of a cam grinding process according to a first embodiment of the invention.
Figure 13:
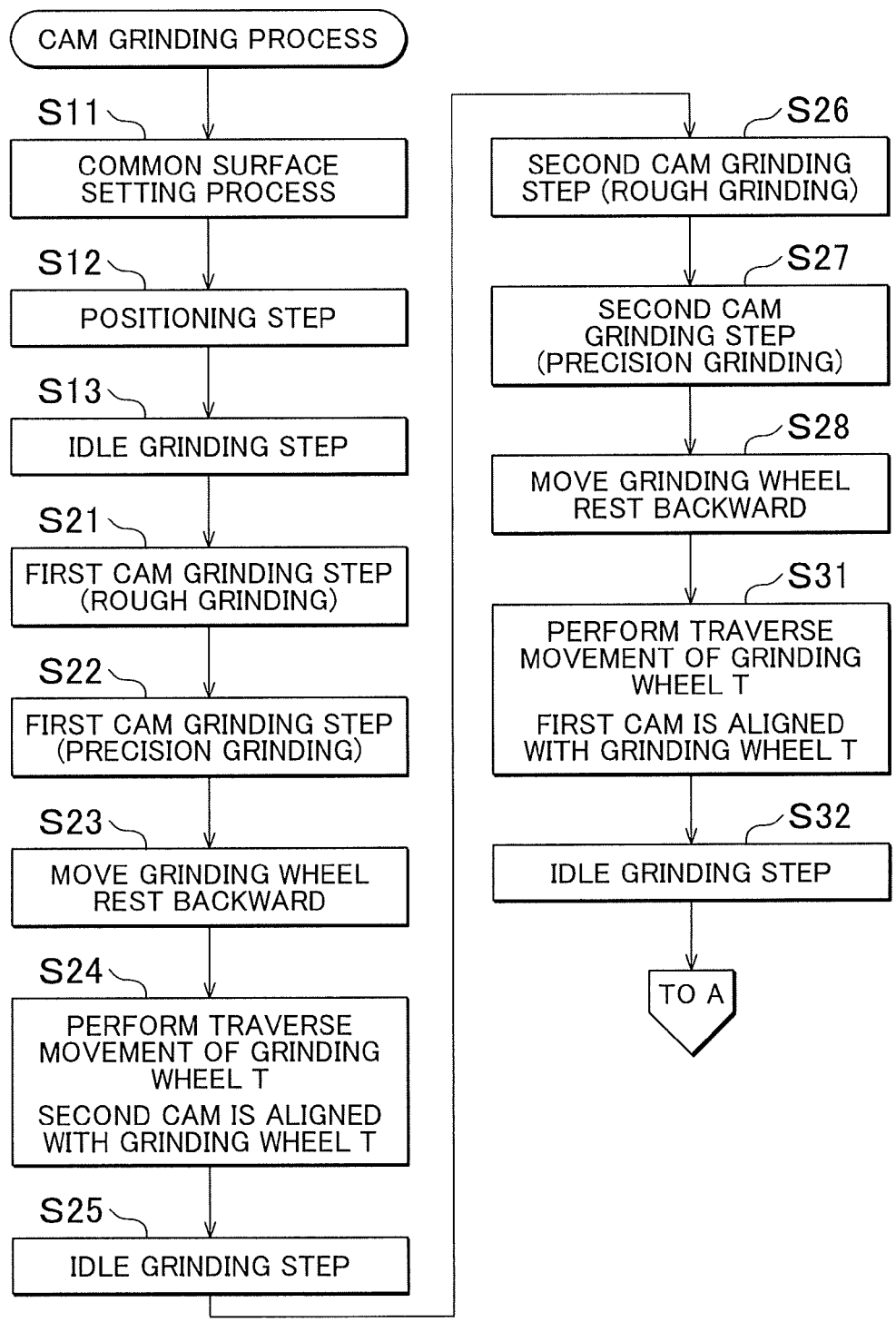
FIG. 13 is a flowchart of a cam grinding step according to a second embodiment of the invention.
Figure 14:
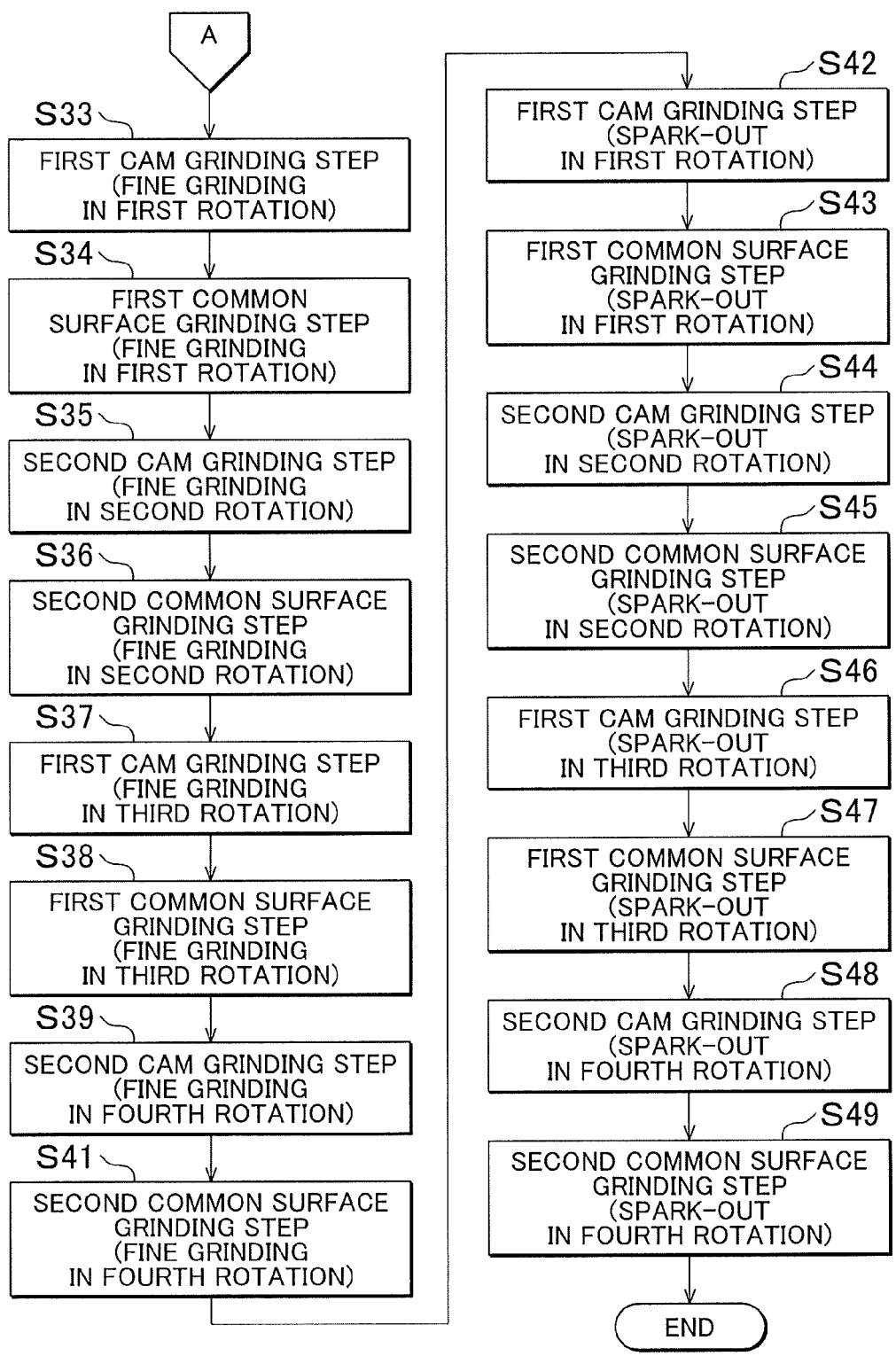
FIG. 14 is a flowchart of the cam grinding step according to the second embodiment of the invention.

A worker inputs a plurality of steps of a cam grinding process into the monitor-equipped input device 32 in a working sequence. The data items (a) to (c) are input into the monitor-equipped input device 32 before a corresponding step, and the data items (d) to (h) and the more detailed working sequence are input into the monitor-equipped input device 32 in a corresponding step. The steps of the cam grinding process are input into the monitor-equipped input device 32 in the working sequence, whereby programs of the cam grinding processes in FIG. 7, FIG. 13, and FIG. 14 are automatically created. Based on the data input into the monitor-equipped input device 32 before corresponding step, and the data and the working sequence input into the monitor-equipped input device 32 in a corresponding step, the numerical control unit 40 automatically create the program of the common surface setting step in FIG. 8, a program of a first cam grinding step in FIG. 9, a program of a second cam grinding step in FIG. 10, a program of a first common surface grinding step in FIG. 11, and a program of a second common surface grinding step in FIG. 12.

The cam grinding machine 30 includes the bed 54 serving as a base on which various devices are mounted. On the bed 54, there are mounted the workpiece table 65 that can be reciprocated in the Z-axis direction by a workpiece table driving device 66, and the grinding wheel rest 50 that can be reciprocated in the X-axis direction by a grinding wheel rest driving device 68. The workpiece table driving device 66 in the present embodiment is an example of "traverse moving device" in the invention, and the grinding wheel rest driving device 68 in the present embodiment is an example of "plunge moving device" in the invention.

On the workpiece table 65, there are mounted the main spindle device 56 including the main spindle 74 that rotates about a main spindle relation axis passing through the center of a center 72 and that is parallel to a Z-axis, and the tailstock 58 including a center 73 provided on the main spindle rotation axis. The main spindle 74 can be rotated by a main spindle driving device 76. The main spindle driving device 76 is an example of "workpiece rotating device" in the invention. The camshaft 18 provided with the composite cams 10, the camshaft 18 being a workpiece W, is held by the center 72 and the center 73. The main spindle 74 is provided with a positioning pin 78 that causes the rotation phase of the camshaft 18, which is the workpiece W, and the rotation phase of the main spindle 74 to coincide with each other. A lathe dog 77 is attached to the camshaft 18, which is the workpiece W, and the lathe dog 77 has a fitting hole (not illustrated) into which the positioning pin 78 is fitted. With this configuration, the camshaft 18 is positioned and held by the center 72 and the center 73 such that the positioning pin 78 is fitted into the fitting hole.

On the grinding wheel rest 50, a grinding wheel driving device 80, such as a motor, is mounted. The grinding wheel T is rotatably supported by the grinding wheel rest 50. The grinding wheel T is rotationally driven by the grinding wheel driving device 80 via a belt and a pulley.

The numerical control unit 40 transmits control signals to the drive units 42, 44, 46, 48, to control driving of the driving devices 68, 76, 66, 80, thereby controlling the various devices. In the present embodiment, the numerical control unit 40 transmits a control signal to the drive unit 42 to control driving of the grinding wheel rest driving device 68, thereby controlling a forward-backward position of the grinding wheel T, that is, a position of the grinding wheel rest 50 in the X-axis direction. The numerical control unit 40 transmits a control signal to the drive unit 44 to control driving of the main spindle driving device 76, thereby controlling a phase of the main spindle 74 in its rotation direction. The numerical control unit 40 transmits a control signal to the drive unit 46 to control driving of the workpiece table driving device 66, thereby controlling a position of the workpiece table 65 in the Z-axis direction. The numerical control unit 40 transmits a control signal to the drive unit 48 to control driving of the grinding wheel driving device 80, thereby controlling a rotation speed of the grinding wheel T.

The drive unit 44 acquires an actual phase of the main spindle 74 in its rotation direction based on a detection signal from an encoder 76E of the main spindle driving device 76, and performs feedback control. The drive unit 42 acquires an actual position of the grinding wheel rest 50 in the X-axis direction based on a detection signal from an encoder 68E of the grinding wheel rest driving device 68, and performs feedback control. The drive unit 46 acquires an actual position of the workpiece table 65 in the Z-axis direction based on a detection signal from an encoder 66E of the workpiece table driving device 66, and performs feedback control.

Specifically, the moving amount of the workpiece table 65 is detected by the encoder 66E and the drive unit 46. The amount of movement of the grinding wheel rest 50 toward the workpiece table 65 is detected by the encoder 68E and the drive unit 42. When the moving amount indicated by a control signal serving as a command signal coincides with the actual moving amount detected by the encoder 68E and the drive unit 42, a completion signal is transmitted to the numerical control unit 40. A phase of the main spindle 74 is detected by the encoder 76E and the drive unit 44. When the phase indicated by a control signal serving as a command signal coincides with the actual phase detected by the encoder 76E and the drive unit 44, a completion signal is transmitted to the numerical control unit 40.

As illustrated in FIG. 5, the workpiece W is held between the center 72 and the center 73 such that the rotation axis P of the camshaft 18 provided with the composite cams 10 coincides with the main spindle rotation axis that is a rotation axis of the main spindle 74.

In the cam grinding machine 30 described in the present embodiment, the main spindle rotation axis (which coincides with the rotation axis P of the camshaft 18 in an example in FIG. 5) and a grinding wheel rotation axis that is a rotation axis of the grinding wheel T are on the same horizontal plane.

Next, the details of the control performed by the numerical control unit 40 will be described. The numerical control unit 40 controls the driving devices that perform grinding of the first cam 12 and the second cam 14. That is, the numerical control unit 40 controls the main spindle driving device 76, which may function as the workpiece rotating device, the workpiece table driving device 66, which may function as the traverse moving device, and the grinding wheel rest driving device 68, which may function as the plunge moving device.

Figure 6:
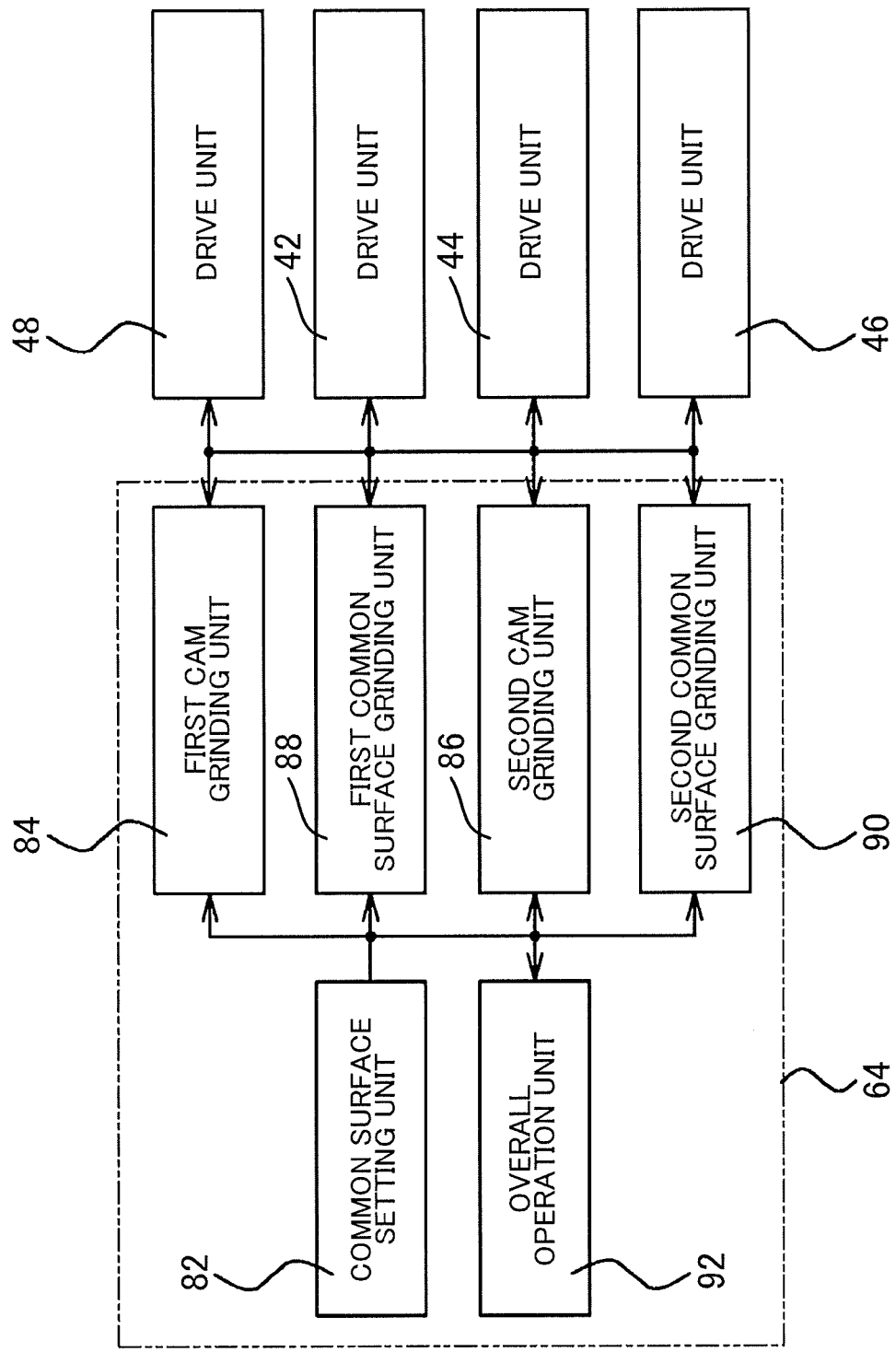
FIG. 6 is a block diagram illustrating control functions of a controller according to the embodiment of the invention.

The numerical control unit 40 includes control functional units configured to control the driving devices described above, as illustrated in FIG. 6. That is, the numerical control unit 40 includes a common surface setting unit 82, a first cam grinding unit 84, a second cam grinding unit 86, a first common surface grinding unit 88, a second common surface grinding unit 90, and an overall operation unit 92.

Figure 8:
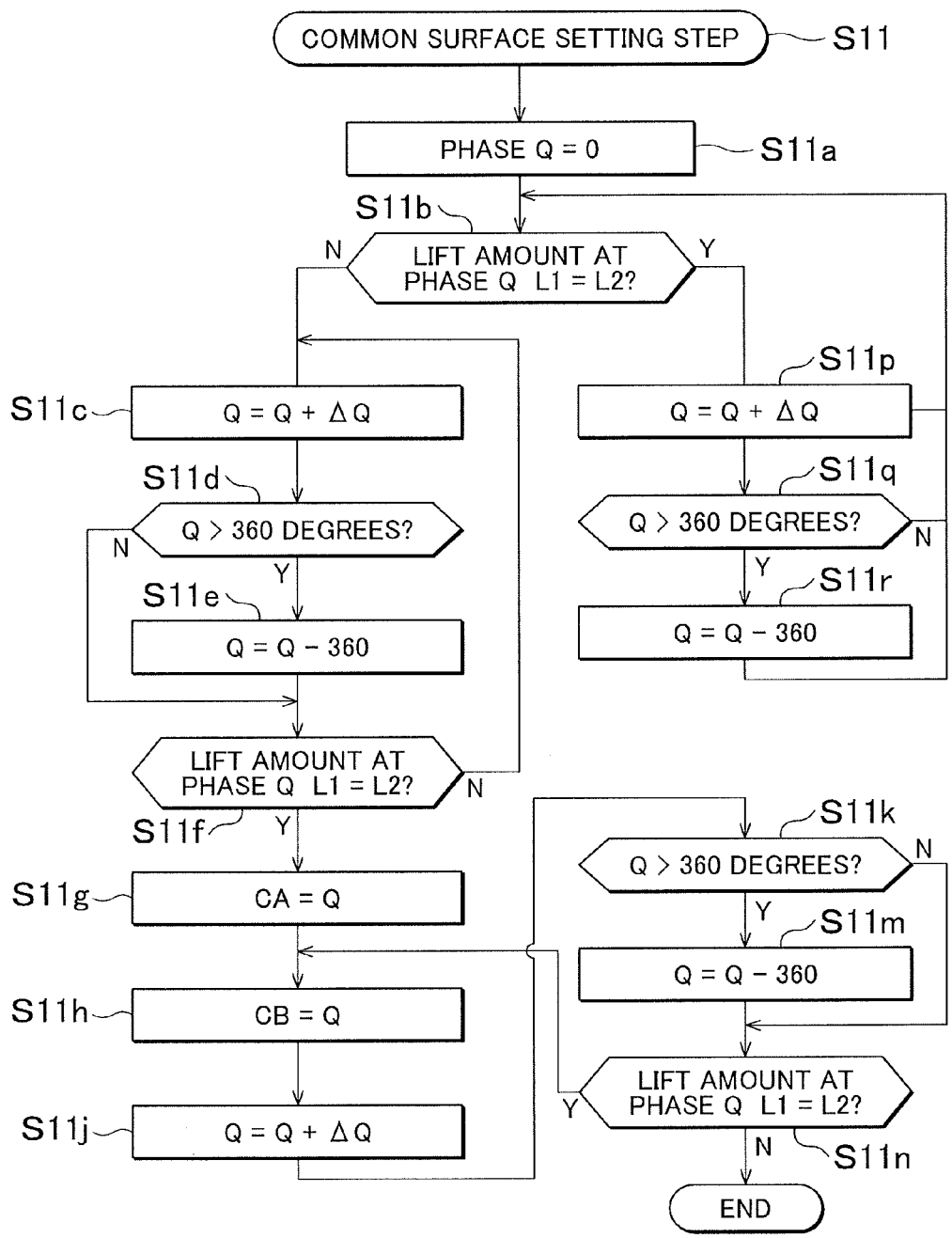
FIG. 8 is a detailed flowchart of a common surface setting step according to an embodiment of the invention.

The common surface setting unit 82 is a functional unit configured to set the common surface C of the first cam 12 and the second cam 14 according to a flow of the program of the common surface setting step in FIG. 8.

Figure 9:
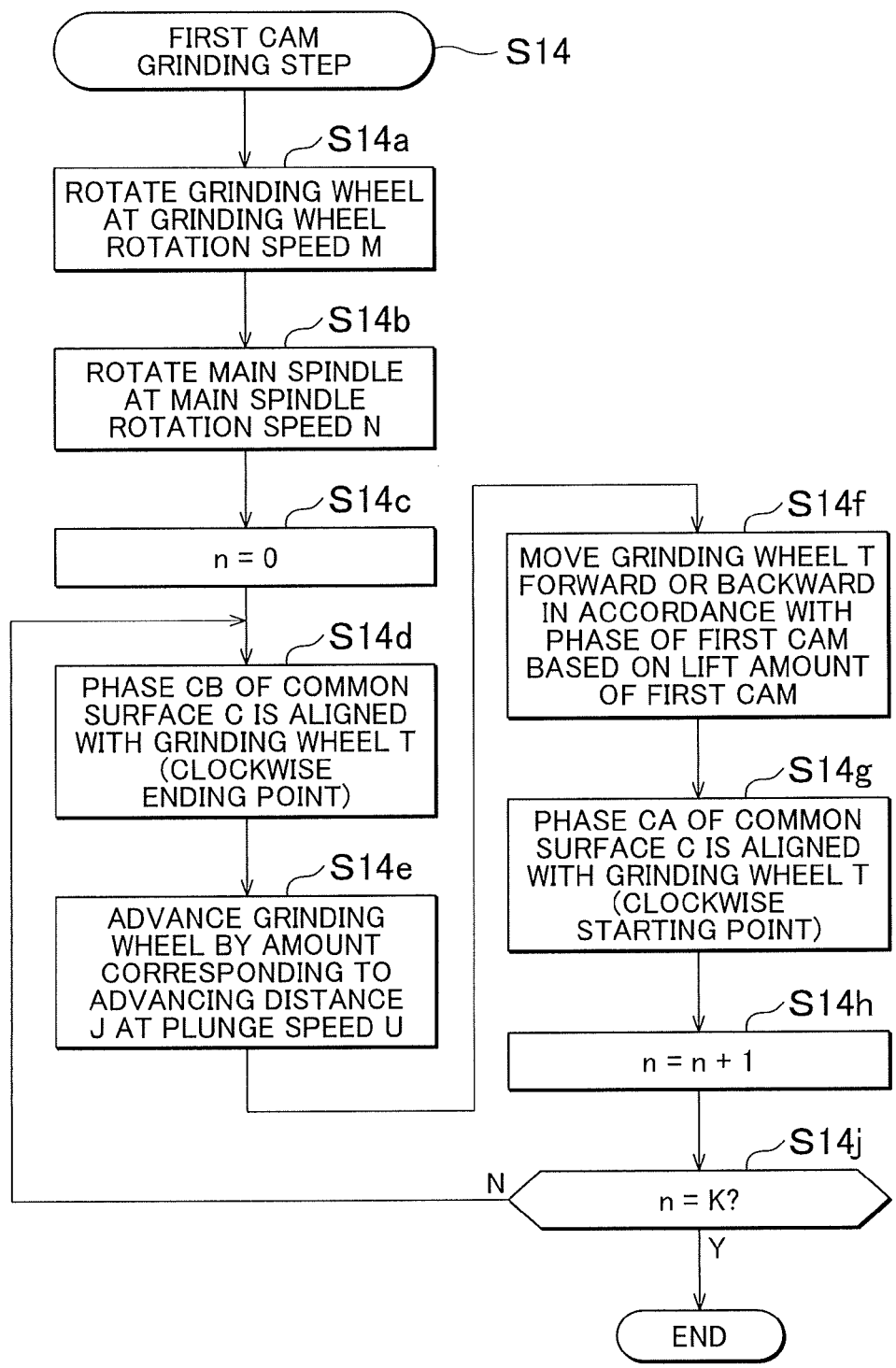
FIG. 9 is a detailed flowchart of a first cam grinding step according to the embodiment of the invention.

The first cam grinding unit 84 is a functional unit configured to perform grinding of the first cam 12 according to a flow of the program of the first cam grinding step in FIG. 9. The second cam grinding unit 86 is a functional unit configured to perform grinding of the second cam 14 according to a flow of the program of the second cam grinding step in FIG. 10.

Figure 11:
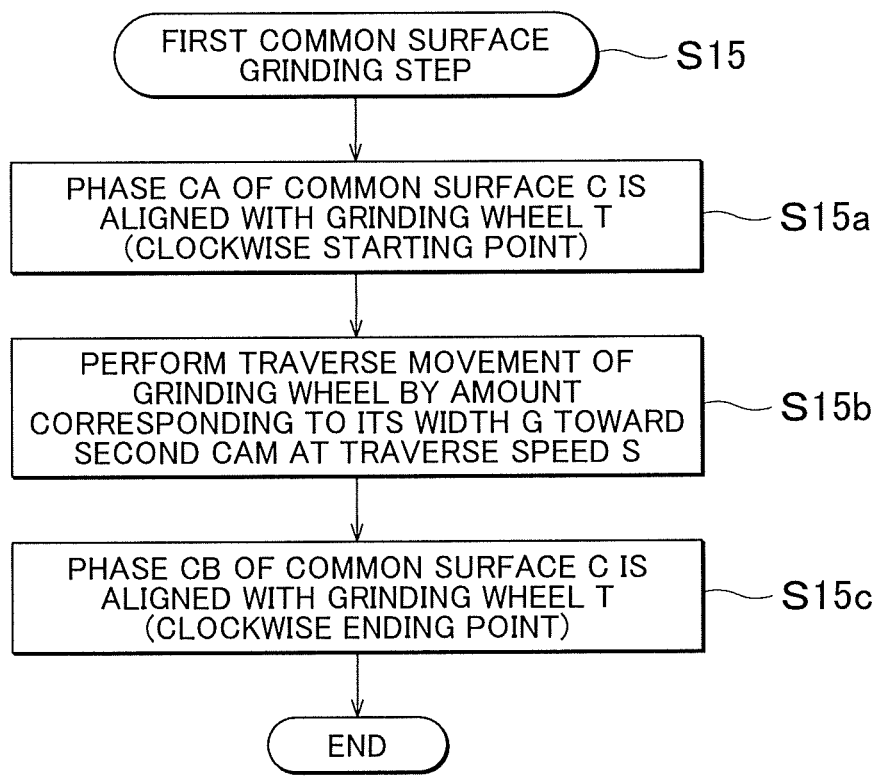
FIG. 11 is a detailed flowchart of a first common surface grinding step according to the embodiment of the invention.

The first common surface grinding unit 88 is a functional unit configured to perform grinding of the common surface according to a flow of the program of the first common surface grinding step in FIG. 11.

Figure 12:
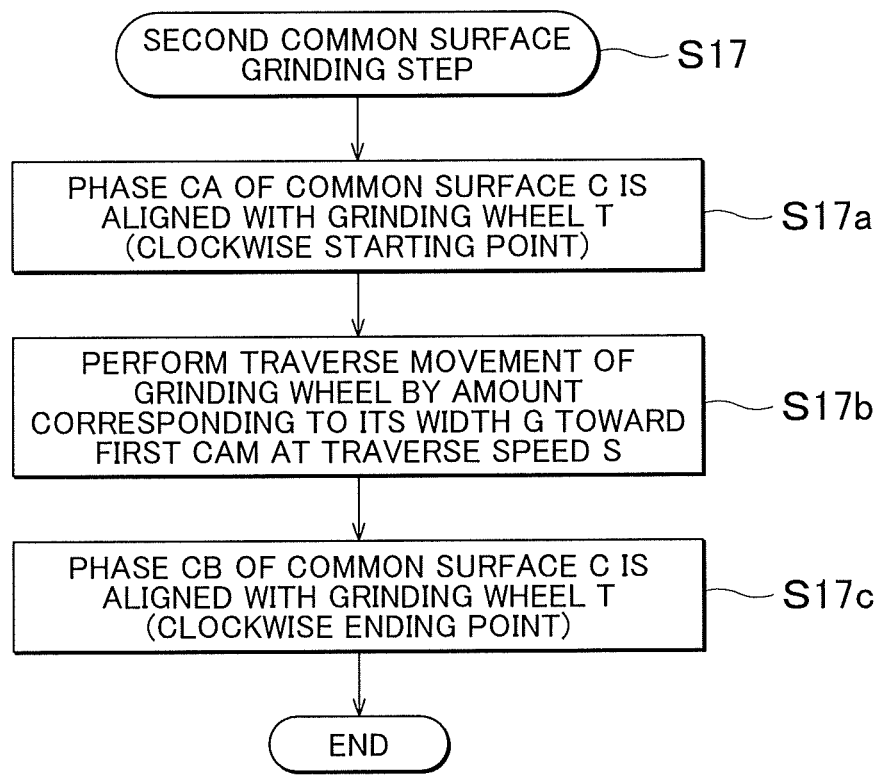
FIG. 12 is a detailed flowchart of a second common surface grinding step according to the embodiment of the invention.

The second common surface grinding unit 90 is a functional unit configured to perform grinding of the common surface according to a flow of the program of the second common surface grinding step in FIG. 12.

FIG. 8 is a flowchart of the program of the common surface setting step. A phase CA that is a starting phase of the common surface C in a clockwise direction, and a phase CB that is an ending phase of the common surface C in the clockwise direction can be acquired in the common surface setting step. A method of acquiring the phase CA and the phase CB will be described below.

The first cam lift data and the second cam lift data to be used in the common surface setting step are received from the monitor-equipped input device 32. Then, the phases in the first cam lift data and the phases in the second cam lift data are aligned with each other based on the angle $\alpha 1$ from the reference phase of the first cam 12 to the phase at the maximum lift of the first cam 12, the phase Q1 at the maximum lift in the first cam lift data, the angle $\alpha 2$ from reference phase of the second cam 14 to phase at the maximum lift of the second cam 14, and the phase Q2 at the maximum lift in the second cam lift data. The corrected first cam lift data and the corrected second cam lift data after the phase alignment are used in the common surface setting step.

As illustrated in FIG. 8, a phase Q is set to zero (S11a). It is determined whether a lift amount L1 when the phase Q is zero in the corrected first cam lift data and a lift amount L2 when the phase Q is zero in the corrected second cam lift data are equal to each other (S11b). The lift amount L1 corresponds to the corrected first cam lift data, and the lift amount L2 corresponds to the corrected second cam lift data. When it is determined in step S11b that the lift amount L1 and the lift amount L2 are equal to each other (YES in step S11b), step S11p, step S11q, and step S11r are repeated until it is determined in step S11b that the lift amount L1 and the lift amount L2 are not equal to each other (NO in step S11b). In step S11p, $\Delta Q$ is added to Q (Q=Q+$\Delta Q$), where $\Delta Q$ is a prescribed phase corresponding to an increase amount. In step S11q, it is determined whether Q is greater than 360 degrees. In step S11r, 360 is subtracted from Q. Step S11r is performed only when it is determined in step S11q that Q is greater than 360 degrees. That is, when the phase Q is zero and the lift amount L1 and the lift amount L2 are equal to each other, the starting phase CA when the lift amount L1 and the lift amount L2 are equal to each other is unclear. Thus, addition of $\Delta Q$ to Q is repeated, so that a start is made from a state where the lift amount L1 and the lift amount L2 are not equal to each other.

When it is determined in step S11b that the lift amount L1 and the lift amount L2 are not equal to each other (NO in step S11b), step S11c, step S11d, and step S11e are repeated until it is determined in step S11f that the lift amount L1 and the lift amount L2 are each other (YES in step S11f). In step S11c, $\Delta Q$ is added to Q (Q=Q+$\Delta Q$), where $\Delta Q$ is a prescribed phase corresponding to an increase amount. In step S11d, it is determined whether Q is greater than 360 degrees. In step S11e, 360 is subtracted from Q. Step S11e is performed only when it is determined in step S11d that Q is greater than 360 degrees. That is, step S11d and step S11e are performed to correct Q such that Q does not exceed 360 degrees and Q falls within a range from zero to 360 ($0 \leq Q \leq 360$).

When it is determined in step S11f that the lift amount L1 and the lift amount L2 are equal to each other (YES in step S11f), CA is set to Q (CA=Q) (S11g). Until it is determined in step S11n that the lift amount L1 and the lift amount L2 are not equal to each other (NO in step S11n), step S11h, step S11j, step S11k, and step S11m are repeated. In step S11h, CB is set to Q. In step S11j, $\Delta Q$ is added to Q (Q=Q+$\Delta Q$), where $\Delta Q$ is a prescribed phase corresponding to an increase amount. In step S11k, it is determined whether Q is greater than 360 degrees. In step S11m, 360 is subtracted from Q. Step S11m is performed only when it is determined in step S11k that Q is greater than 360 degrees.

When it is determined in step S11n that the lift amount L1 and the lift amount L2 are not equal to each other (NO in step S11n), the program ends. In this way, the phase CA that is a starting phase of the common surface C in the clockwise direction, and the phase CB that is an ending phase of the common surface C in the clockwise direction are acquired.

FIG. 9 is a flowchart of the program of the first cam grinding step. Grinding of the first cam 12 according to the first cam grinding step will be described below. First, the grinding wheel T is rotated at a grinding wheel rotation speed M (S14a), and the main spindle 74 is rotated at a main spindle rotation speed N (S14b). The number of rotations n is set to zero (n=0) (S14c). At a position where the grinding wheel T is aligned with the phase CB of the common surface C (S14d), the grinding wheel T starts to be advanced toward the workpiece W at a plunge speed U, and is advanced by an amount corresponding to an advancing distance J while the workpiece W is rotated (S14e). The grinding wheel T is advanced by an amount corresponding to the advancing distance J while the workpiece W is rotated, and the grinding wheel T is moved forward or backward in accordance with the phase of the first cam 12 based on the lift amount of the first cam 12. After advancement by an amount corresponding to the advancing distance J is completed, the grinding wheel T is moved forward or backward in accordance with the phase of the first cam 12 based on the lift amount of the first cam 12 (S14f). When the grinding wheel T is aligned with the phase CA of the common surface C (S14g), one is added to n, that is, the number of rotations n is counted up by one (n=n+1) (S14h). When it is determined in step S14j that n is not equal to K (NO in step S14j), step S14d to step S14j are repeated. When it is determined in step S14j that n is equal to K (YES in step S14j), the program of the first cam grinding step is finished, and the grinding of the first cam is finished. In steps S21 and S22 in FIG. 13 described later, for example, K is set to four, five, or six. In steps S33, S37, S42, and S46 in FIG. 14 described later, K is set to one.

Figure 10:
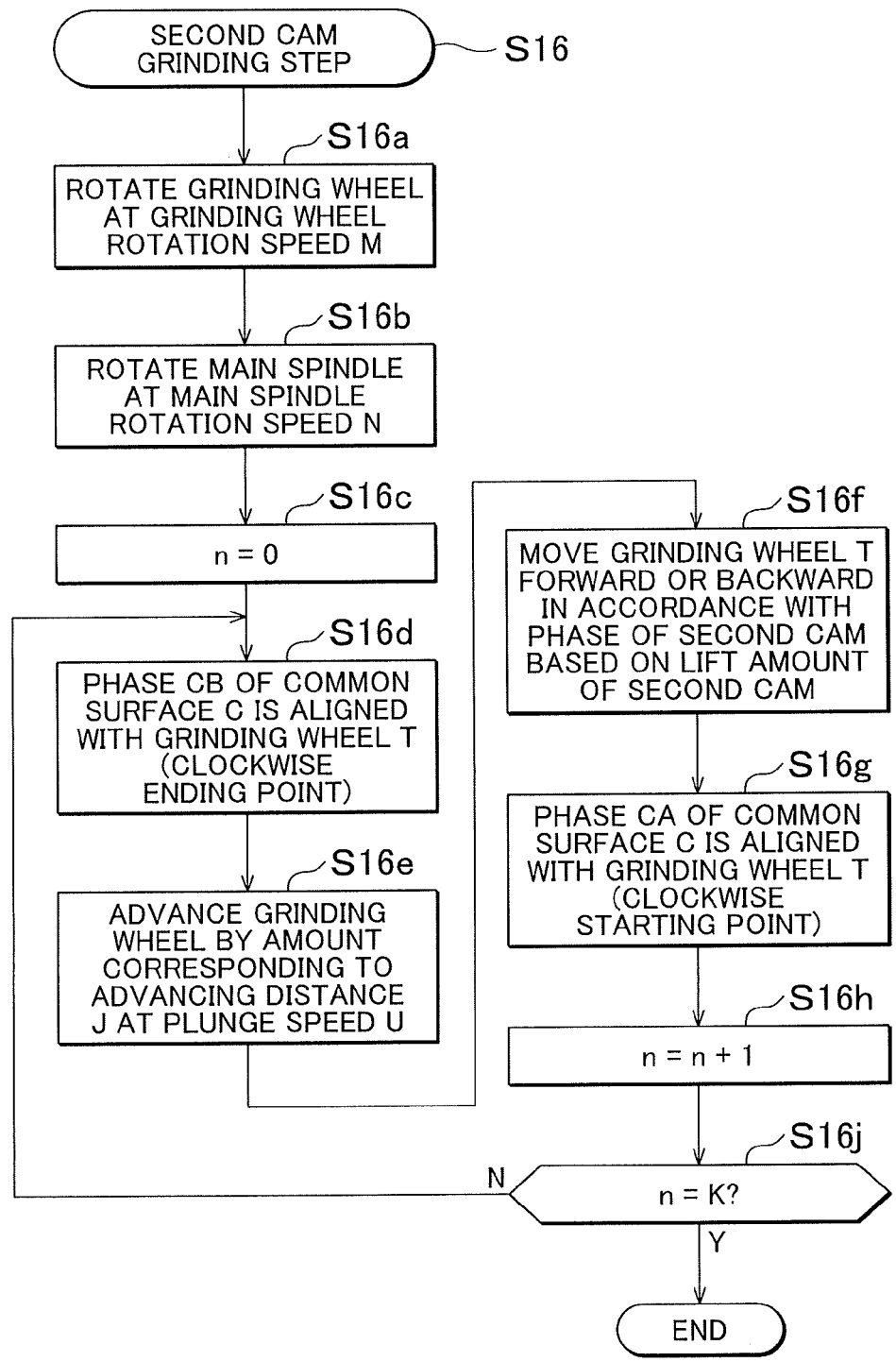
FIG. 10 is a detailed flowchart of a second cam grinding step according to the embodiment of the invention.

FIG. 10 is a flowchart of the program of the second cam grinding step. Grinding of the second cam 14 according to the second cam grinding step will be described below. First, the grinding wheel T is rotated at a grinding wheel rotation speed M (S16a), and the main spindle 74 is rotated at a main spindle rotation speed N (S16b). When the second cam grinding step is performed after the first common surface grinding step, the grinding wheel rotation speed M and the main spindle rotation speed N in the second cam grinding step are set to the same values as the grinding wheel rotation speed M and the main spindle rotation speed N in the first cam grinding step. The number of rotations n is set to zero (n=0) (S16c). At a position where the grinding wheel T is aligned with the phase CB of the common surface C (S16d), the grinding wheel T starts to be advanced toward the workpiece W at a plunge speed U, and is advanced by an amount corresponding to the advancing distance J while the workpiece W is rotated (S16e). The grinding wheel T is advanced by an amount corresponding to the advancing distance J while the workpiece W is rotated, and the grinding wheel T is moved forward or backward in accordance with the phase of the first cam 12 based on the lift amount of the second cam 14. After advancement by an amount corresponding to the advancing distance J is completed, the grinding wheel T is moved forward or backward in accordance with the phase of the second cam 14 based on the lift amount of the second cam 14 (S14f). When the second cam grinding step is performed after the first common surface grinding step, the advancing distance J in step S16e is set to zero because the grinding wheel T has been already advanced by an amount corresponding to the advancing distance J in the first cam grinding step. When the grinding wheel T is aligned with the phase CA of the common surface C (S16g), one is added to n, that is, the number of rotations n is counted up by one (n=n+1) (S16h). When it is determined in step S16j that n is not equal to K (NO in step S16j), step S16d to step S16e are repeated. When it is determined in step S16j that n is equal to K (YES in step S16j), the program of the second cam grinding step is finished, and the grinding of the second cam is finished. In steps S26 and S27 in FIG. 13 described later, for example, K is set to four, five, or six. In steps S35, S39, S44, and S48 in FIG. 14 described later, K is set to one.

FIG. 11 is a flowchart of the program of the first common surface grinding step. Grinding of the common surface C according to the first common surface grinding step will be described below. The grinding wheel rotation speed M and the main spindle rotation speed N in the first common surface grinding step are set to the same value as the grinding wheel rotation speed M and the main spindle rotation speed N in the first cam grinding step. The first common surface grinding step is performed after the first cam grinding step, and thus an operation of rotating the grinding wheel T at the grinding wheel rotation speed M and an operation of rotating the main spindle 74 at the main spindle rotation speed N, which are performed in the first cam grinding step, are continued in the first common surface grinding step. Although the flow in FIG. 11 actually includes a step of rotating the grinding wheel T and a step of rotating the main spindle 74, the steps are not illustrated in FIG. 11 because the steps are the operations continued from the first cam grinding step as described above.

The grinding wheel T is aligned with the phase CA of the common surface C (S15a), and traverse movement of the grinding wheel T toward the second cam 14 is made with respect to the workpiece W at a traverse speed S (S15b). Because the grinding wheel T has been already advanced by an amount corresponding to the advancing distance J in the first cam grinding step, grinding of the common surface C is performed just by making the traverse movement of the grinding wheel T toward the second cam 14. The traverse movement of the grinding wheel T by an amount corresponding to a width Td of the grinding wheel T is made, and, at the same time, the grinding wheel T is aligned with the phase CB of the common surface C (S15c), and then the program of the first common surface grinding step is ended to end the grinding of the common surface C.

FIG. 12 is a flowchart of the program of the second common surface grinding step. Grinding of the common surface C according to the second common surface grinding step will be described below. The grinding wheel rotation speed M and the main spindle rotation speed N in the second common surface grinding step are set to the same values as the grinding wheel rotation speed M and the main spindle rotation speed N in the first cam grinding step. The second common surface grinding step is performed after the first cam grinding step, and thus an operation of rotating the grinding wheel T at the grinding wheel rotation speed M and an operation of rotating the main spindle 74 at the main spindle rotation speed N, which are performed in the first cam grinding step, are continued in the second common surface grinding step. Although the flow in FIG. 12 actually includes a step of rotating the grinding wheel T and a step of rotating the main spindle 74, the steps are not illustrated in FIG. 12 because the steps are the operations continued from the first cam grinding step as described above.

The grinding wheel T is aligned with the phase CA of the common surface C (S17a), and traverse movement of the grinding wheel T toward the first cam 12 is made with respect to the workpiece W at the traverse speed S (S17b). Because the grinding wheel T has been already advanced by an amount corresponding to the advancing distance J in the first cam grinding step, grinding of the common surface C is performed just by making the traverse movement of the grinding wheel T toward the first cam 12. The traverse movement of the grinding wheel T by an amount corresponding to the width Td of the grinding wheel T is made, and, at the same time, the grinding wheel T is aligned with the phase CB of the common surface C (S17c), and then the program of the second common surface grinding step is ended to end the grinding of the common surface C.

As the flow of the program of the cam grinding process for controlling the operations of the driving devices by using the corresponding functional units, there are the flow of the program of the cam grinding process according to a first embodiment illustrated in FIG. 7, and the flow of the program of the cam grinding process according to a second embodiment illustrated in FIG. 13 and FIG. 14. Each of the embodiments will be described below.

FIG. 13 and FIG. 14 illustrate a flowchart of the program of the cam grinding process according to the second embodiment. The cam grinding process according to the second embodiment will be described below. In the common surface setting step (S11), the common surface C of the first cam 12 and the second cam 14, that is, the phase CA, which is the starting phase of the common surface C in the clockwise direction, and the phase CB, which is the ending phase of the common surface C in the clockwise direction, are acquired according to the flow in FIG. 8.

In a positioning step (S12), plunge sliding of the grinding wheel T toward the workpiece W is performed to move the grinding wheel T to an idle grinding starting position, and traverse sliding of the workpiece W is performed. At the idle grinding starting position, a right end Tg of the grinding wheel T is aligned with the boundary Wp between the first cam 12 and the second cam 14 in the Z-axis direction, and the outer periphery of the grinding wheel T is apart from the outer periphery of the workpiece W by an amount corresponding to the advancing distance Ja in the X-axis direction.

The advancing distance Ja will be described below. The advancing distance Ja at the time of the idle grinding is greater than the maximum lift amount of the first cam 12 or the maximum lift amount of the second cam 14, and the advancing distance Ja is set to such an amount that the grinding wheel T does not interfere with the first cam 12 and the second cam 14 even if traverse movement of the workpiece table 65 is made when the grinding wheel rest 50 is at the position before the idle grinding. That is, the maximum lift amount is obtained by subtracting the minimum value of lift data from the maximum value of the lift data. The minimum value of the lift data is a radius of each of the first base circular surface C1 and the second base circular surface C2.

In an idle grinding step (S13), the grinding wheel T is rotated at a grinding wheel rotation speed Ma, the main spindle 74 is rotated at a main spindle rotation speed Na, and the grinding wheel T is advanced toward the workpiece W by an amount corresponding to the advancing distance Ja at a plunge speed Ua. In this way, the grinding wheel T is brought into contact with the first cam 12 of the workpiece W.

In a first cam grinding step (rough grinding) (S21), the grinding wheel T is rotated at a grinding wheel rotation speed Mb, the main spindle 74 is rotated at a main spindle rotation speed Nb, and the grinding wheel T is advanced toward the workpiece W by an amount corresponding to an advancing distance Jb at a plunge speed Ub. In the first cam grinding step (rough grinding) (S21), the flow of the first cam grinding step (S14) in FIG. 9 is performed. In the flow, there are used the preset various setting values for the rough grinding, such as the rotation speed Mb of the grinding wheel T, the rotation speed Nb of the main spindle 74, the advancing distance Jb of the grinding wheel T, the number of rotations Kb of the main spindle 74, and the plunge speed Ub of the grinding wheel T. For example, Kb is set to four, and an operation from step S14*d* to step S14*j* is repeatedly performed four times. After step S14*j*, the workpiece W is further rotated to be ground, and the phase CB of the common surface C is aligned with the grinding wheel T. Then, the flow ends.

In a first cam grinding step (precision grinding) (S22), the grinding wheel T is rotated at a grinding wheel rotation speed Mc, the main spindle 74 is rotated at a main spindle rotation speed Nc, and the grinding wheel T is advanced toward the workpiece W by an amount corresponding to an advancing distance Jc at a plunge speed Uc. In the first cam grinding step (precision grinding) (S22), the flow of the first cam grinding step (S14) in FIG. 9 is performed. In the flow, there are used the preset various setting values for the precision grinding, such as the rotation speed Mc of the grinding wheel T, the rotation speed Nc of the main spindle 74, the advancing distance Jc of the grinding wheel T, the number of rotations Kc of the main spindle 74, and the plunge speed Uc of the grinding wheel T. For example, Kc is set to four, and an operation from step S14*d* to step S14*j* is repeatedly performed four times. After step S14*j*, the workpiece W is further rotated to be ground, and the phase CB of the common surface C is aligned with the grinding wheel T. Then, the flow ends.

Figure 17:
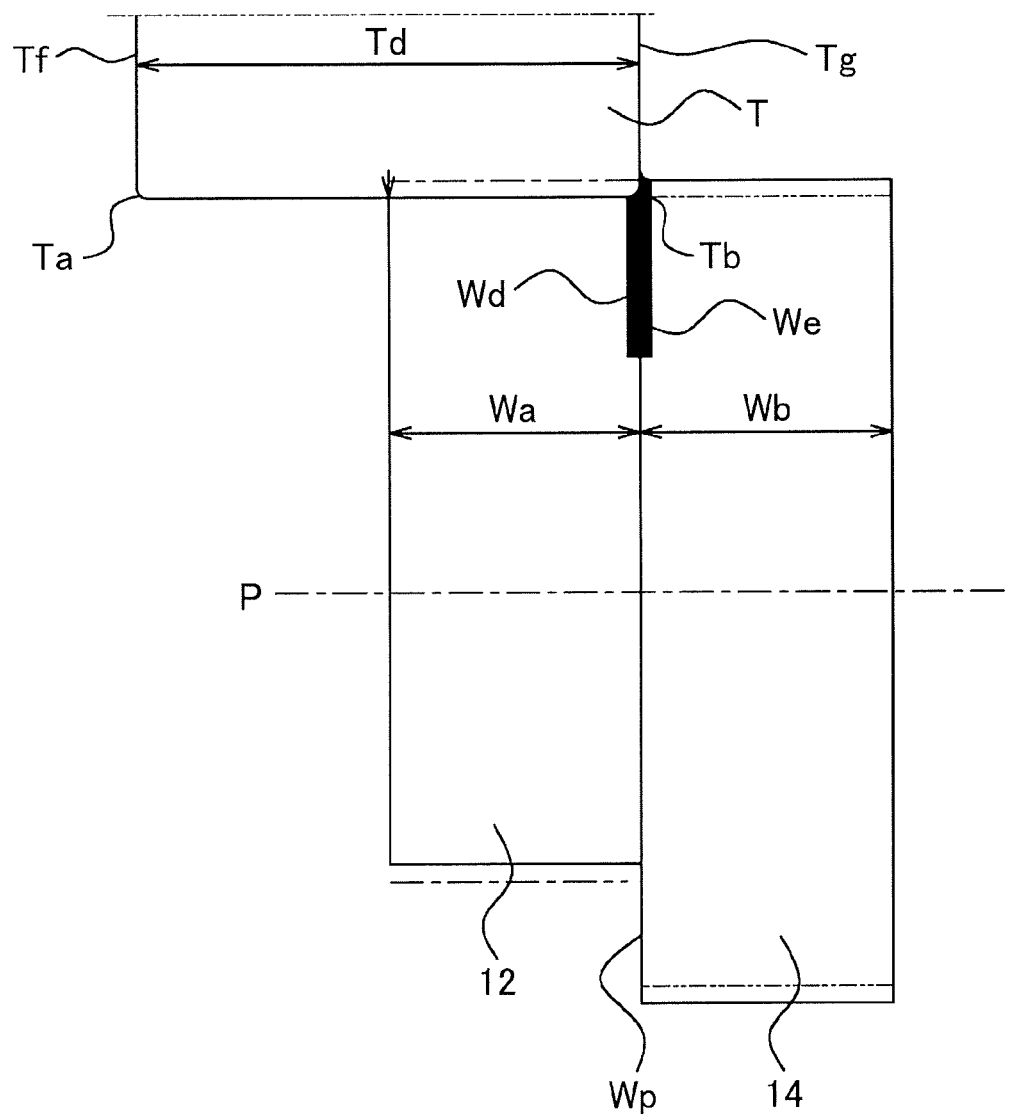
FIG. 17 illustrates a first cam grinding step of an embodiment of the invention.
Figure 18:
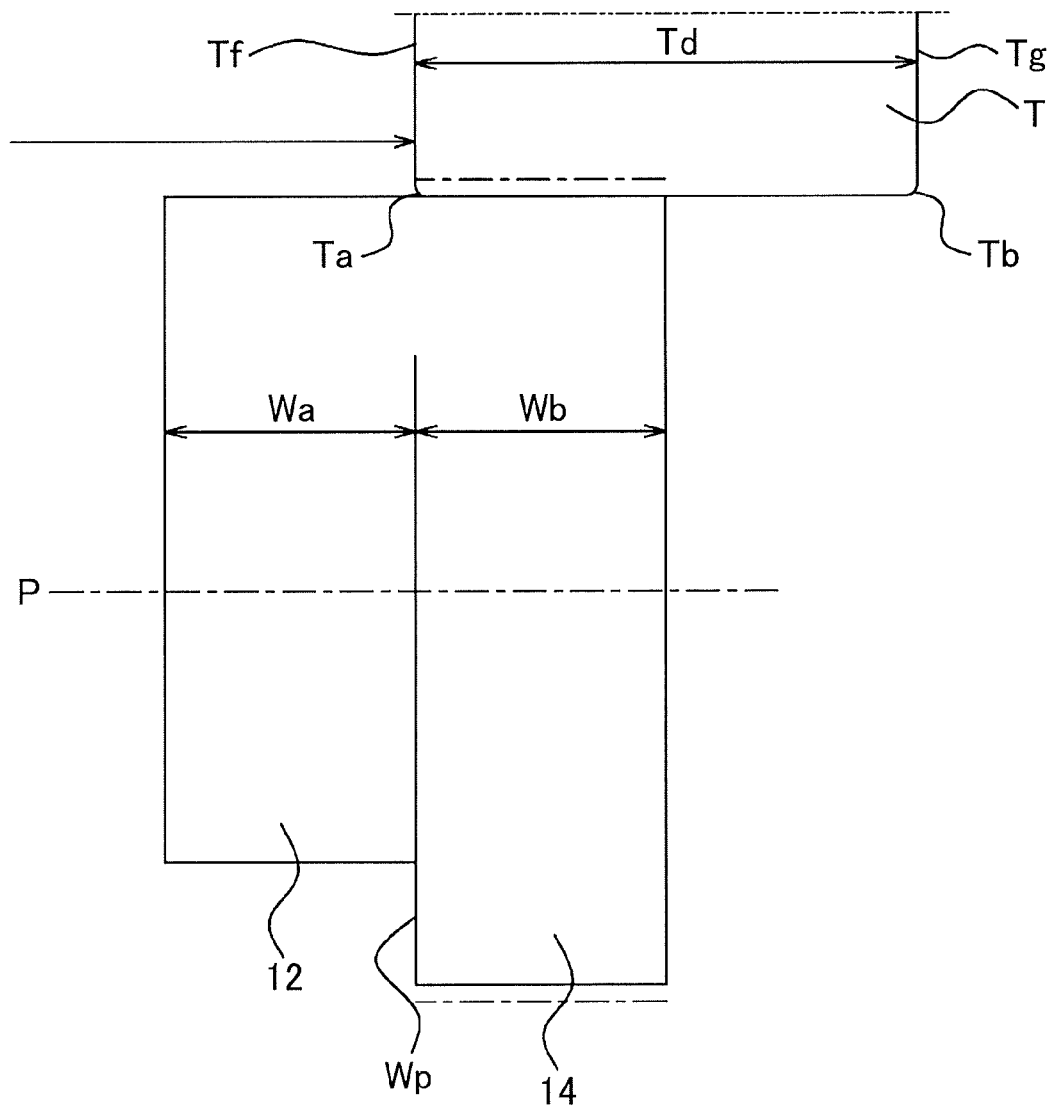
FIG. 18 illustrates a first common surface grinding step according to embodiment of the invention.
Figure 19:
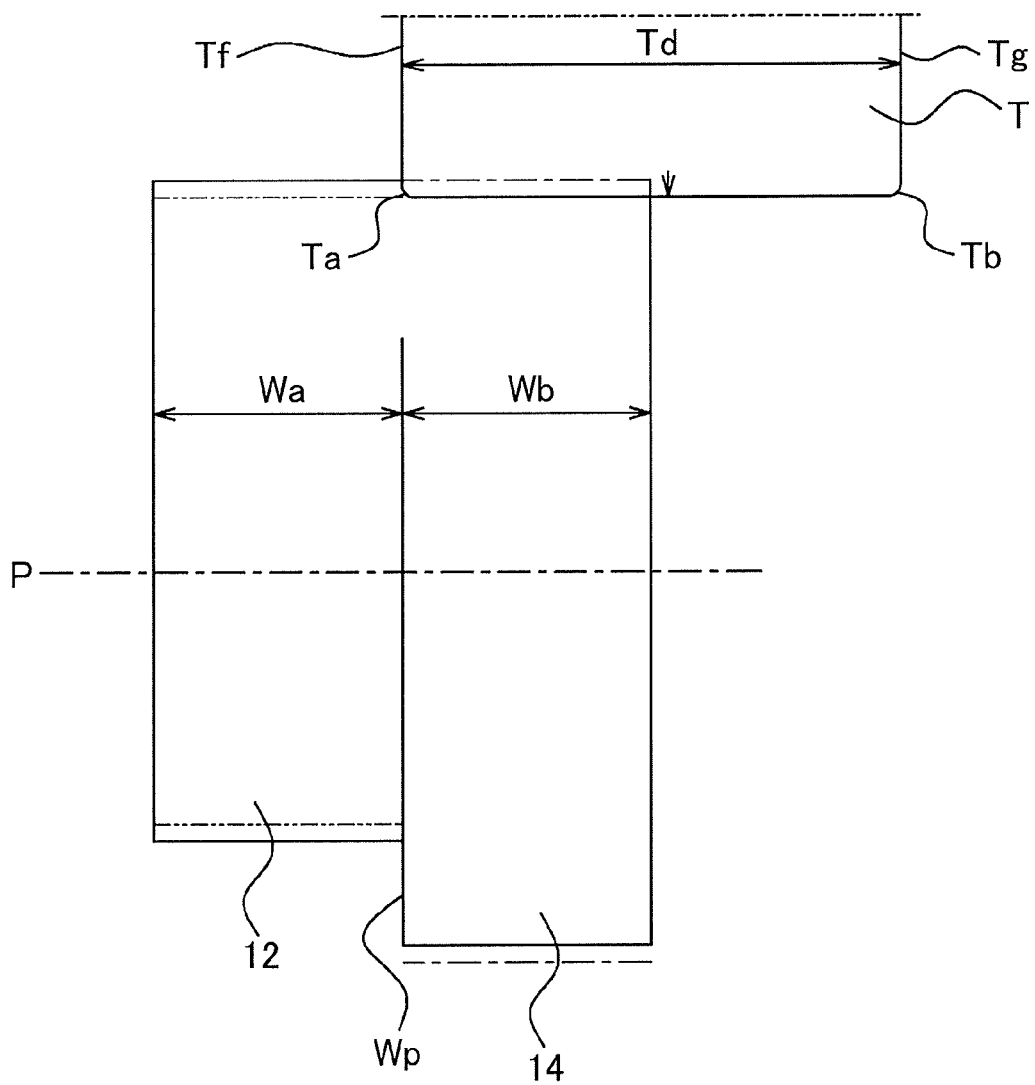
FIG. 19 illustrates a second cam grinding step according to the embodiment of the invention.
Figure 20:
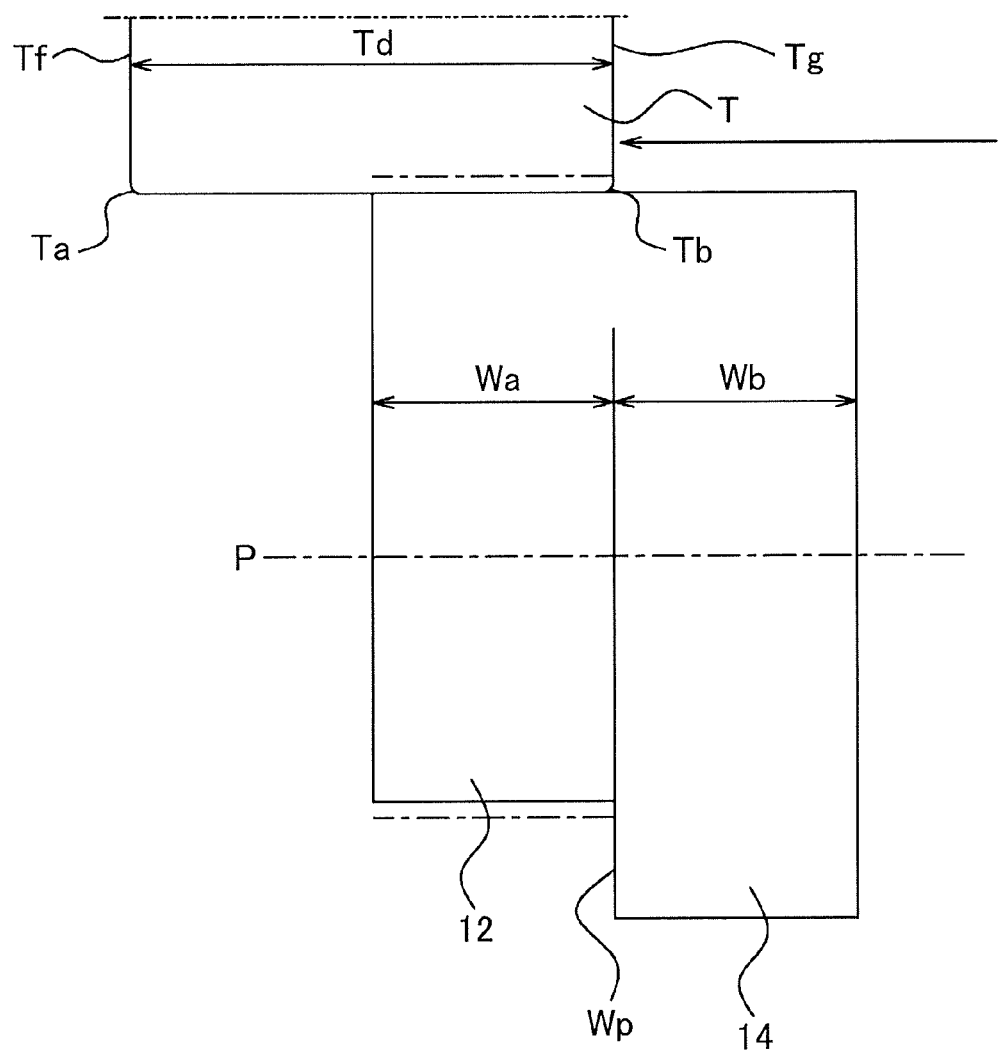
FIG. 20 illustrates a second common surface grinding step according to the embodiment of the invention.
Figure 21:
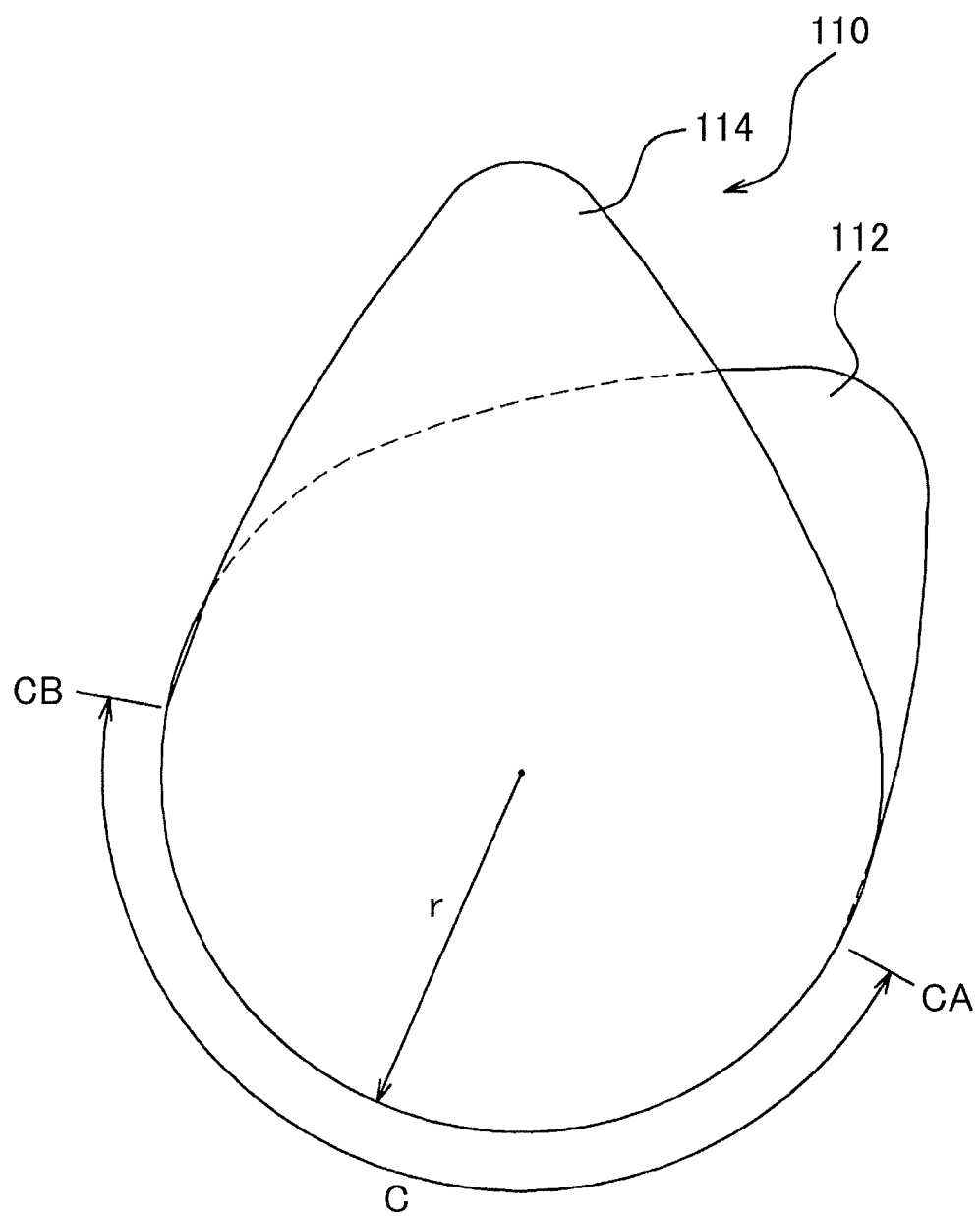
FIG. 21 is a schematic view of a composite cam as viewed from a rotation axial direction, for description of related art.
Figure 22:
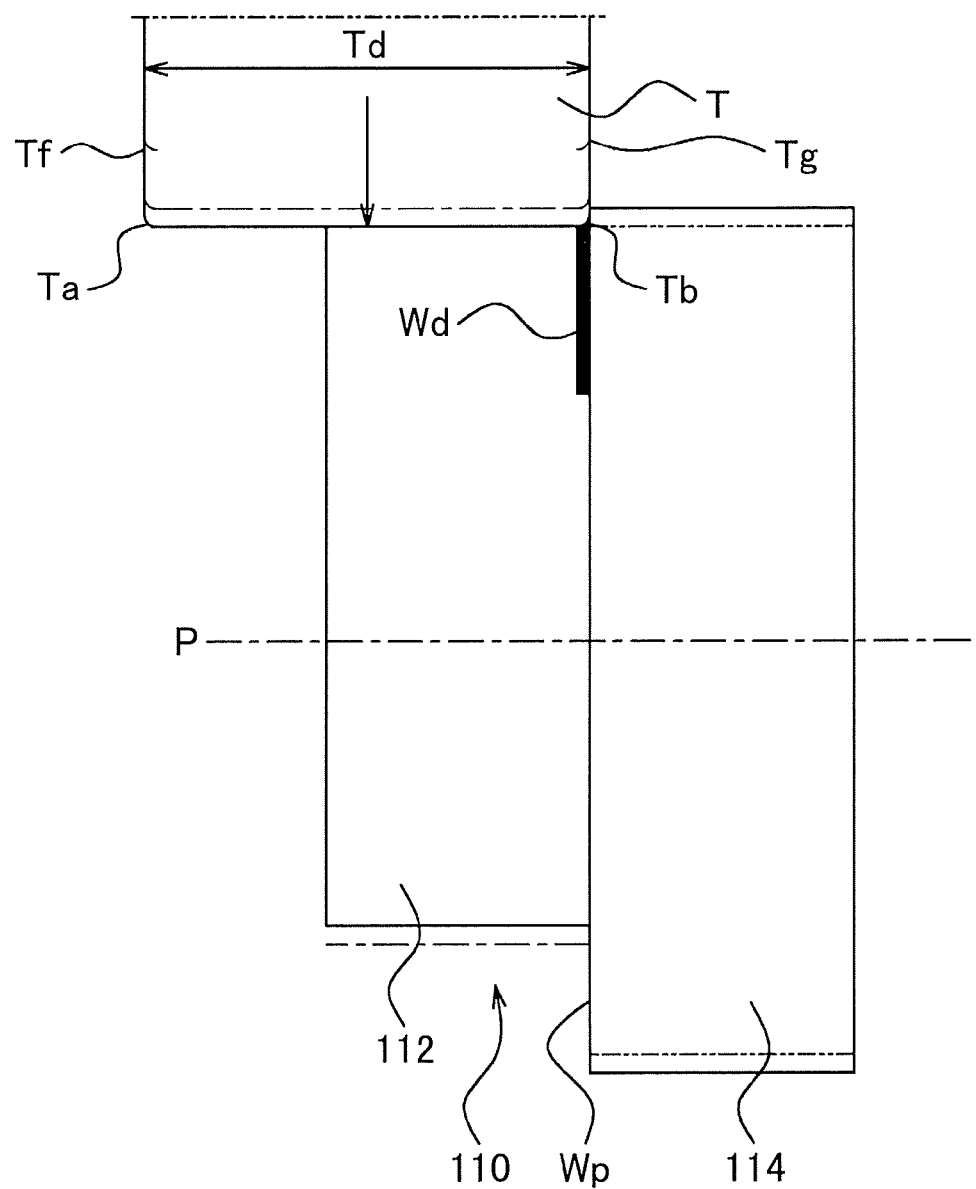
FIG. 22 illustrates a state where a first cam is ground, for description of the related art.
Figure 23:
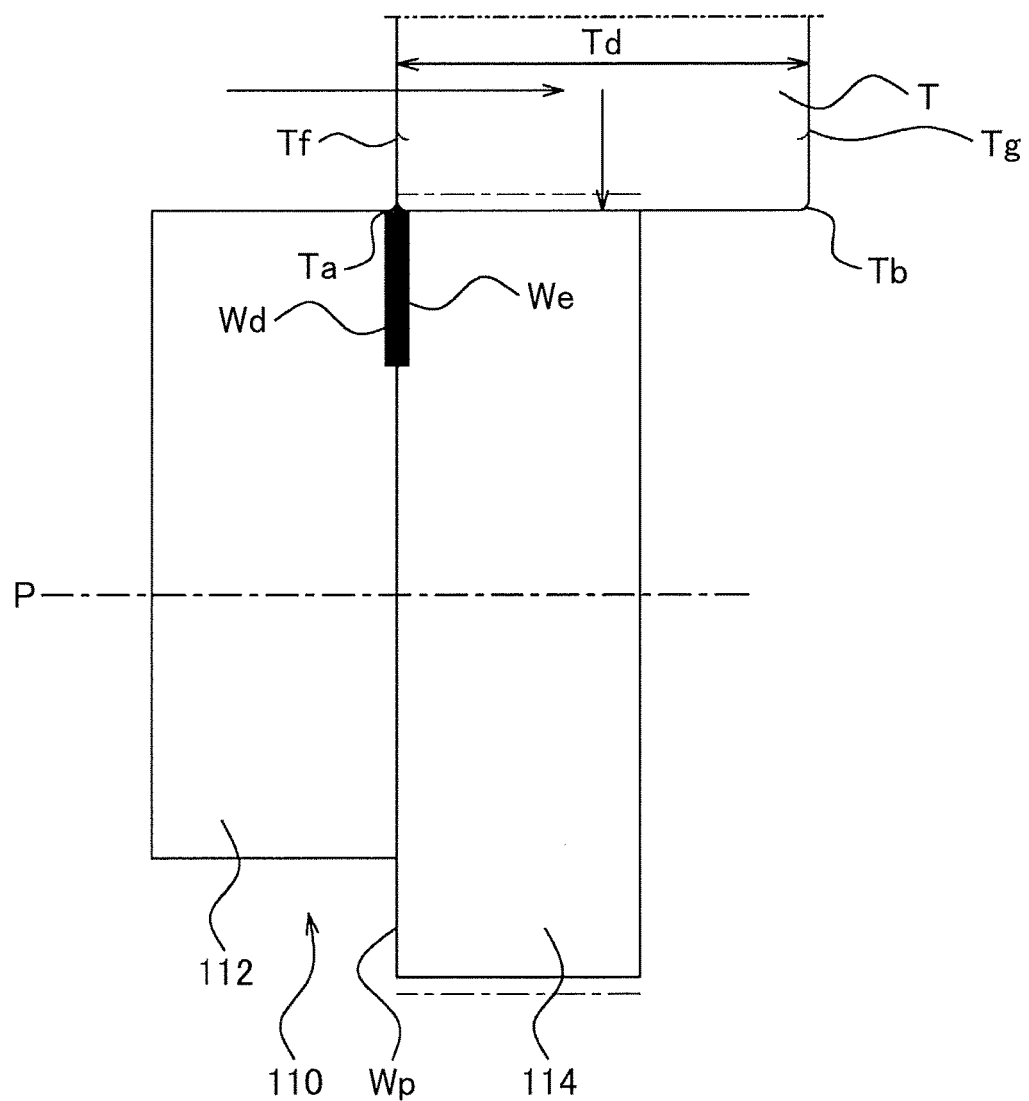
FIG. 23 illustrates a state where a second cam is ground, for description of the related art.

In plunge grinding of the first cam 12 performed by the grinding wheel T in steps S21 and S22, an unground portion Wd is formed at a boundary portion of the first cam 12, which is on the second cam 14-side (FIG. 17). The unground portion Wd is illustrated as a black-filled portion.

In step S23, the grinding wheel T is moved backward in a direction away from the workpiece W by an amount corresponding to an advancing distance (Ja+Jb+Jc) at the plunge speed Ua.

In step S24, the workpiece table 65 is moved leftward by an amount corresponding to the width Td of the grinding wheel T, so that a left end Tf of the grinding wheel T is aligned with the boundary Wp between the first cam 12 and the second cam 14. That is, the second cam 14 is aligned with the grinding wheel T.

In an idle grinding step (S25), the grinding wheel T is rotated at the grinding wheel rotation speed Ma, the main spindle 74 is rotated al the main spindle rotation speed Na, and the grinding wheel T is advanced toward the workpiece W by an amount corresponding to the advancing distance Ja at the plunge speed Ua. In this way, the grinding wheel T is brought into contact with the second cam 14 of the workpiece W.

In a second cam grinding step (rough grinding) (S26), the grinding wheel is rotated at the grinding wheel rotation speed Mb, the main spindle 74 is rotated at the main spindle rotation speed Nb, and the grinding wheel T is advanced toward the workpiece W by an amount corresponding to the advancing distance Jb at the plunge speed Ub. In the second cam grinding step (rough grinding) (S26), the flow of the second cam grinding step (S16) in FIG. 10 is performed. In the flow, there are used the preset various setting values for the rough grinding, such as the rotation speed Mb of the grinding wheel T, the rotation speed Nb of the main spindle 74, the advancing distance Jb of the grinding wheel T, the number of rotations Kb of the main spindle 74, and the plunge speed Ub of the grinding wheel T. For example, Kb is set to four, and an operation from step S16*d* to step S16*j* is repeatedly performed four times. After step S16*j*, the workpiece W is further rotated to be ground, and the phase CB of the common surface C is aligned with the grinding wheel T. Then, the flow ends.

In a second cam grinding step (precision grinding) (S27), the grinding wheel is rotated at the grinding wheel rotation speed Mc, the main spindle 74 is rotated at the main spindle rotation speed Nc, and the grinding wheel T is advanced toward the workpiece W by an amount corresponding to the advancing distance Jc at me plunge speed Uc. In the second cam grinding step (precision grinding) (S27), the flow of the second cam grinding step (S16) in FIG. 10 is performed. In the flow, there are used the preset various setting values for the precision grinding, such as the rotation speed Mc of the grinding wheel T, the rotation speed Nc of the main spindle 74, the advancing distance Jc of the grinding wheel T, the number of rotations Kc of the main spindle 74, and the plunge speed Uc of the grinding wheel T. For example, Kc is set to four, and an operation from step S16*d* to step S16*j* is repeatedly performed four times. After step S16*j*, the workpiece W is further rotated to be ground, and the phase CB of the common surface C is aligned with the grinding wheel T. Then, the flow ends.

In the plunge grinding of the second cam 14 performed by the grinding wheel T in steps S26 and S27, an unground portion We is formed in a boundary portion of the second cam 14, which is on the first cam 12-side (FIG. 17). The unground portion We is illustrated as a black-filled portion.

Figure 16:
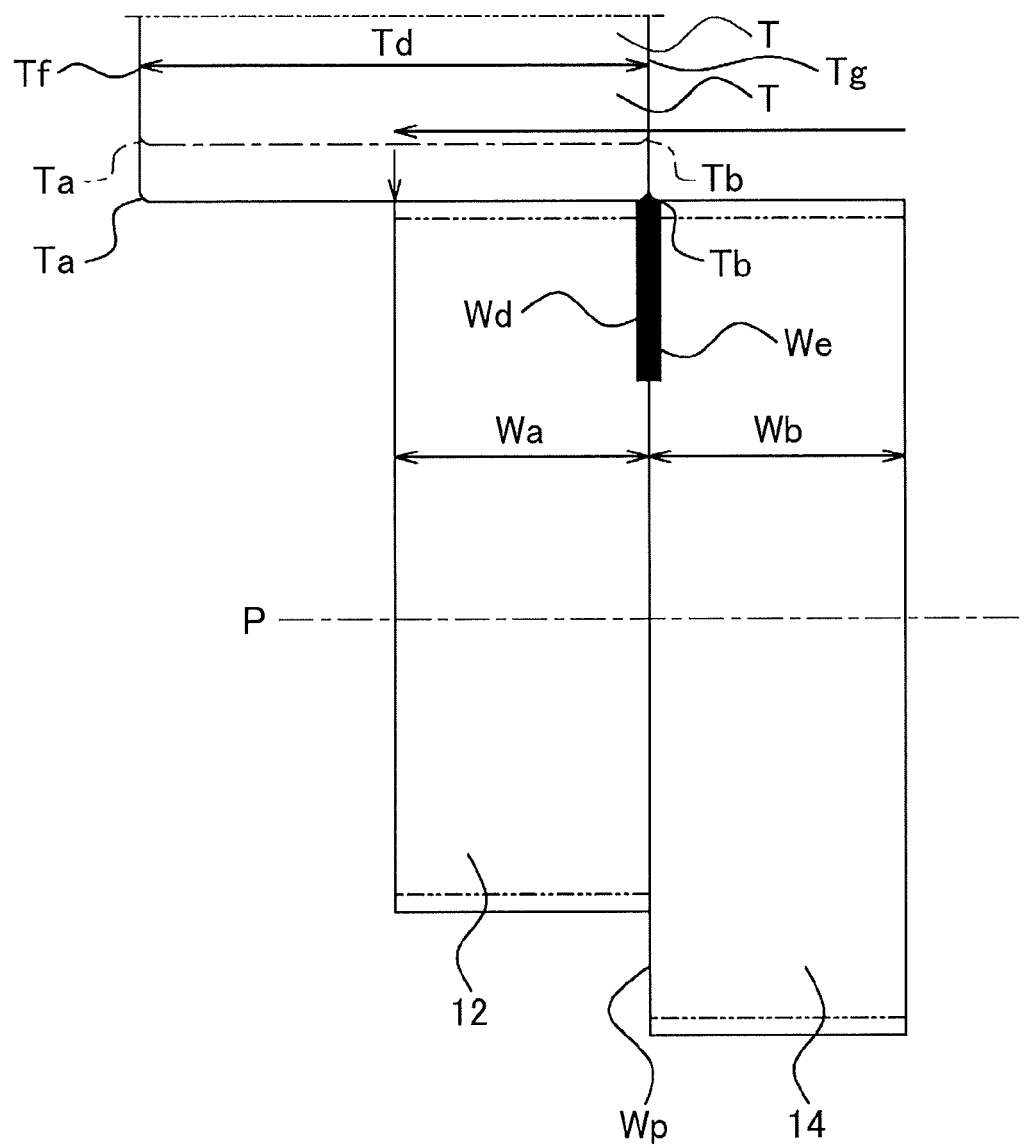
FIG. 16 illustrates a traverse movement step and an idle grinding step according to an embodiment of the invention.

A phenomenon in which the unground portions Wd, We are formed will be described in detail below. As illustrated in FIG. 16, the width of the grinding wheel T in the axial direction is usually greater than the width of each of the first cam 12 for low-speed use and the second cam 14 for high-speed use in the axial direction. As the grinding wheel T performs grinding of the first cam 12 and the second cam 14, each of which is the workpiece W, so-called shear droop is generated at both end edges Ta, Tb on a grinding face side of the grinding wheel T. That is, abrasion proceeds more quickly at the both end edges Ta, Tb than at a central portion of the grinding wheel T, so that the shear droop is generated.

When plunge grinding of the first cam 12 is performed, the grinding wheel T is positioned such that the right end Tg thereof is aligned with the boundary Wp between the first cam 12 and the second cam 14. Thus, the left end Tf of the grinding wheel T sticks out from the left end of the first cam 12. As a result, shear droop at the left end edge Ta of the grinding wheel T does not affect the grinding of the first cam 12. However, shear droop at the right end edge Tb of the grinding wheel T affects the grinding of the first cam 12, at a position on the second cam 14 side. As a result, the unground portion Wd is left. In FIG. 16, a black-filled portion is the unground portion Wd. While a grinding allowance of the first cam 12 is indicated by an imaginary line in FIG. 12, the grinding allowance is exaggeratingly illustrated for easy understanding.

Subsequently, after the grinding of the first cam 12 is finished, the grinding wheel T is relatively moved to a position corresponding to the second cam 14, and plunge grinding of the second cam 14 is performed by the grinding wheel T, as illustrated in FIG. 16. In the plunge grinding, the grinding wheel T is positioned such that the left end edge Ta of the grinding wheel T is aligned with the boundary Wp between the first cam 12 and the second cam 14. Thus, the right end Tg of the grinding wheel T sticks out from the right end of the second cam 14. As a result, shear droop at the right side of the grinding wheel T does not affect the grinding of the second cam 14. However, shear droop at the left end edge Ta of the grinding wheel T affects the grinding of a portion of the second cam 14, which is on the boundary Wp between the first cam 12 and the second cam 14. As a result, the unground portion We is left. The unground portion We is illustrated in FIG. 16 together with the unground portion Wd of the first cam 12, as black-filled portions.

In step S28, the grinding wheel T is moved backward in a direction away from the workpiece W by an amount corresponding to the advancing distance Ja at the plunge speed Ua.

In step S31, the workpiece table 63 is moved rightward by an amount corresponding to the width Td of the grinding wheel T, and the right end Tg of the grinding wheel T is aligned with the boundary Wp between the first cam 12 and the second cam 14. That is, the first cam 12 is aligned with the grinding wheel T.

In an idle grinding step (S32), the grinding wheel T is rotated at the grinding wheel rotation speed Ma, the main spindle 74 is rotated at the main spindle rotation speed Na, and the grinding wheel T is advanced toward the workpiece W by an amount corresponding to the advancing distance Ja at the plunge speed Ua. In this way, the grinding wheel T is brought into contact with the first cam 12 of the workpiece W.

In a first cam grinding step (fine grinding in the first rotation) (S33), the grinding wheel T is rotated at a grinding wheel rotation speed Md, the main spindle 74 is rotated at a main spindle rotation speed Nd, and the grinding wheel T is advanced toward the workpiece W by an amount corresponding to an advancing distance Jd at a plunge speed Ud. In the first cam grinding step (fine grinding in the first rotation) (S21), the flow of the first cam grinding step (S14) in FIG. 9 is performed. In the flow, there are used the preset various setting values for the fine grinding, such as the rotation speed Md of the grinding wheel T, the rotation speed Nd of the main spindle 74, the advancing distance Jd of the grinding wheel T, the number of rotations Kd of the main spindle 74, and the plunge speed Ud of the grinding wheel T. Kd is set to one, and an operation from step S14*d* to step S14*j* is performed only once. In this way, the fine grinding of the first cam 12 from the phase CB to the phase CA is performed.

In a first common surface grinding step (fine grinding in the first rotation) (S34), the flow of the first common surface grinding step (S15) in FIG. 11 is performed. In the flow, there are used the preset various setting values for the fine grinding, such as the rotation speed Md of the grinding wheel T, and the rotation speed Nd of the main spindle 74. The rotation of the grinding wheel T at the grinding wheel rotation speed Md and the rotation of the main spindle 74 at the main spindle rotation speed Nd in step S33 are continued without any change. In this way, the fine grinding from the phase CA of the first cam 12 to the phase CB of the second cam 14 is performed. After the workpiece table 65 is moved leftward, the left end Tf of the grinding wheel T is aligned with the boundary Wp between the first cam 12 and (he second cam 14. That is, the second cam 14 is aligned with the grinding wheel T.

The unground portions Wd, We illustrated as black-filled portions are removed in step S34 (FIG. 17).

In a second cam grinding step (fine grinding in the second rotation) (S35), the flow of the second cam grinding step (S16) in FIG. 10 is performed. In the flow, there are used the preset various setting values for the fine grinding, such as the rotation speed Md of the grinding wheel T, the rotation speed Nd of the main spindle 74, the advancing distance Jd of the grinding wheel T, the number of rotations Kd of the main spindle 74, and the plunge speed Ud of the grinding wheel T. Kd is set to one, and an operation from step S14*d* to step S14*j* is performed only once. The advancing distance Jd of the grinding wheel T is zero. In this step, the grinding is performed at a position at which the grinding wheel T has reached after being advanced by an amount corresponding to the advancing distance Jd in the first cam grinding step (fine grinding in the first rotation) (S33), the grinding wheel T is not further advanced. The rotation of the grinding wheel T at the grinding wheel rotation speed Md and the rotation of the main spindle 74 at the main spindle rotation speed Nd in step S33 are continued without any change. In this way, the fine grinding of the second cam 14 from the phase CB to the phase CA is performed.

In a second common surface grinding step (fine grinding in the second rotation) (S36), the flow of the second common surface grinding step (S17) in FIG. 12 is performed. In the flow, there are used the preset various setting values for the fine grinding, such as the rotation speed Md of the grinding wheel T, and the rotation speed Nd of the main spindle 74. The rotation of the grinding wheel T at the grinding wheel rotation speed Md and the rotation of the main spindle 74 at the main spindle rotation speed Nd in step S33 are continued without any change. In this way, the fine grinding from the phase CA of the second cam 14 to the phase CB of the first cam 12 is performed. After the workpiece table 65 is moved rightward, the right end Tg of the grinding wheel T is aligned with the boundary Wp between the first cam 12 and the second cam 14. That is, the first cam 12 is aligned with the grinding wheel T.

In the second cam grinding step (fine grinding in the second rotation) (S35), the fine grinding of the second cam 14 from the phase CB to the phase CA is performed, and the fine grinding of the second cam 14 from the phase CA to the phase CB is not performed, so that no unground portion is formed at the boundary Wp on the common surface C. In addition, in the second common surface grinding step (fine grinding in the second rotation) (S36), the fine grinding from phase CA of the second cam 14 to the phase CB of the first cam 12 is performed across the boundary Wp, and thus no unground portion is formed at the boundary Wp on the common surface C.

In a first cam grinding step (fine grinding in the third rotation) (S37), an operation similar to that in step S33 is repeatedly performed. In this way, the fine grinding of the first cam 12 from the phase CB to the phase CA is performed.

In a first common surface grinding step (fine grinding in the third rotation) (S38), an operation similar to that in step S34 is repeatedly performed. In this way, the fine grinding from the phase CA of the first cam 12 to the phase CA of the second cam 14 is performed. After the workpiece table 65 is moved leftward, the second cam 14 is aligned with the grinding wheel T.

In the first cam grinding step (fine grinding in the third rotation) (S37), the fine grinding of the first cam 12 from the phase CB to the phase CA is performed, and the fine grinding of the first cam 12 from the phase CA to the phase CB is not performed, so that no unground portion is formed at the boundary Wp on the common surface C. In the first common surface grinding step (fine grinding in the third rotation) (S38), the fine grinding from the phase CA of the first cam 12 to the phase CB of the second cam 14 is performed across the boundary Wp, and thus no unground portion is formed at the boundary Wp on the common surface C.

In a second cam grinding step (fine grinding in the fourth rotation) (S39), an operation similar to that in step S35 is repeatedly performed. In this way, the fine grinding of the second cam 14 from the phase CB to the phase CA is performed.

In a second common surface grinding step (fine grinding in the fourth rotation) (S41), an operation similar to that in step S36 is repeatedly performed. In this way, the fine grinding from the phase CA of the second cam 14 to the phase CA of the first cam 12 is performed. After the workpiece table 65 is moved rightward, the first cam 12 is aligned with the grinding wheel T.

In the second cam grinding step (fine grinding in the fourth rotation) (S39), the fine grinding of the second cam 14 from the phase CB to the phase CA is performed, and the fine grinding of the second cam 14 from the phase CA to the phase CB is not performed, so that no unground portion is formed at the boundary Wp on the common surface C. In the second common surface grinding step (fine grinding in the fourth rotation) (S41), the fine grinding from the phase CA of the second cam 14 to the phase CB of the first cam 12 is performed across the boundary Wp, and thus no unground portion is formed at the boundary Wp on the common surface C.

In a first cam grinding step (spark-out in the first rotation) (S42), the grinding wheel T is rotated at a grinding wheel rotation speed Me, and the main spindle 74 is rotated at a main spindle rotation speed Ne. In the first cam grinding step (spark-out in the first rotation) (S42), the flow of the first cam grinding step (S14) in FIG. 9 is performed. In the flow, there are used the preset various setting values for the spark-out, such as the rotation speed Me of the grinding wheel T, the rotation speed Ne of the main spindle 74, the advancing distance Je of the grinding wheel T, the number of rotations Ke of the main spindle 74, and a plunge speed Ue of the grinding wheel T. The advancing distance Je of the grinding wheel T is zero. Ke is set to one, and an operation from step S14*d* to step S14*j* is performed only once. In this way, the spark-out of the first cam 12 from the phase CB to the phase CA is performed.

In a first common surface grinding step (spark-out in the first rotation) (S43), the flow of the first common surface grinding step (S15) in FIG. 11 is performed. In the flow, there are used the preset various setting values for the spark-out, such as the rotation speed Me of the grinding wheel T, and the rotation speed Ne of the main spindle 74. The rotation of the grinding wheel T at the grinding wheel rotation speed Me and the rotation of the main spindle 74 at the main spindle rotation speed Ne in step S42 are continued without any change. In this way, the spark-out from the phase CA of the first cam 12 to the phase CB of the second cam 14 is performed. After the workpiece table 65 is moved leftward, the left end Tf of the grinding wheel T is aligned with the boundary Wp between the first cam 12 and the second cam 14. That is, the second cam 14 is aligned with the grinding wheel T.

In the first cam grinding step (spark-out in the first rotation) (S42), the spark-out of the first cam 12 from the phase CB to the phase CA is performed, and the spark-out of the first cam 12 from the phase CA to the phase CB is not performed, so that no unground portion is formed at the boundary Wp on the common surface C. In the first common surface grinding step (spark-out in the first rotation) (S43), the spark-out from the phase CA of the first cam 12 to the phase CB of the second cam 14 is performed across the boundary Wp, and thus no unground portion is formed at the boundary Wp on the common surface C.

In a second cam grinding step (spark-out in the second rotation) (S44), the flow of the second cam grinding step (S16) in FIG. 10 is performed. In the flow, there are used the preset various setting values for the spark-out, such as the rotation speed Me of the grinding wheel T, the rotation speed Ne of the main spindle 74, the advancing distance Je of the grinding wheel T, the number of rotations Ke of the main spindle 74, and the plunge speed Ue of the grinding wheel T. Ke is set to one, and an operation from step S14*d* to step S14*j* is performed only once. The advancing distance Je of the grinding wheel T is zero. The rotation of the grinding wheel T at the grinding wheel rotation speed Me and the rotation of the main spindle 74 at the main spindle rotation speed Ne in step S42 are continued without any change. In this way, the spark-out of the second cam 14 from the phase CB to the phase CA is performed.

In a second common surface grinding step (spark-out in the second rotation) (S45), the flow of the second common surface grinding step (S17) in FIG. 12 is performed. In the flow, there are used the preset various setting values for the spark-out, such as the rotation speed Me of the grinding wheel T, and the rotation speed Ne of the main spindle 74. The rotation of the grinding wheel T at the grinding wheel rotation speed Me and the rotation of the main spindle 74 at the main spindle rotation speed Ne in step S42 are continued without any change. In this way, the spark-out from the phase CA of the second cam 14 to the phase CB of the first cam 12 is performed. After the workpiece table 65 is moved rightward, the right end Tg of the grinding wheel T is aligned with the boundary Wp between the first cam 12 and the second cam 14. That is, the first cam 12 is aligned with the grinding wheel T.

In the second cam grinding step (spark-out in the second rotation) (S44), the spark-out of the second cam 14 from the phase CB to the phase CA is performed, and the spark-out of the second cam 14 from the phase CA to the phase CB is not performed, so that no unground portion is formed at the boundary Wp on the common surface C. In the second common surface grinding step (spark-out in the second rotation) (S45), the spark-out from the phase CA of the second cam 14 to the phase CB of the first cam 12 is performed across the boundary Wp, and thus no unground portion is formed at the boundary Wp on the common surface C.

In a first cam grinding step (spark-out in the third rotation) (S46), an operation similar to that in step S42 is repeatedly performed. In this way, the spark-out of the first cam 12 from the phase CB to the phase CA is performed.

In a first common surface grinding step (spark-out in the third rotation) (S47), an operation similar to that in step S43 is repeatedly performed. In this way, the spark-out from the phase CA of the first cam 12 to the phase CA of the second cam 14 is performed. After the workpiece table 65 is moved leftward, the second cam 14 is aligned with the grinding wheel T.

In the first cam grinding step (spark-out in the third rotation) (S46), the spark-out of the first cam 12 from the phase CB to the phase CA is performed, and the spark-out of the first cam 12 from the phase CA to the phase CB is not performed, so that no unground portion is formed at the boundary Wp on the common surface C. In the first common surface grinding step (spark-out in the third rotation) (S47), the spark-out from the phase CA of the first cam 12 to the phase CB of the second cam 14 is performed across the boundary Wp, and thus no unground portion is formed at the boundary Wp on the common surface C.

In a second cam grinding step (spark-out in the fourth rotation) (S48), operation similar to that in step S44 is repeatedly performed. In this way, the spark-out of the second cam 14 from the phase CB to the phase CA is performed.

In a second common surface grinding step (spark-out in the fourth rotation) (S49), an operation similar to that in step S45 is repeatedly performed. In this way, the spark-out from the phase CA of the second cam 14 to the phase CA of the first cam 12 is performed. After the workpiece table 63 is moved rightward, the first cam 12 is aligned with the grinding wheel T.

In the second cam grinding step (spark-out in the fourth rotation) (S48), the spark-out of the second cam 14 from the phase CB to the phase CA is performed, and the spark-out of the second cam 14 from the phase CA to the phase CB is not performed, so that no unground portion is formed at the boundary Wp on the common surface C. In the second common surface grinding step (spark-out in the fourth rotation) (S49), the spark-out from the phase CA of the second cam 14 to the phase CB of the first cam 12 is performed across the boundary Wp, and thus no unground portion is formed at the boundary Wp on the common surface C.

After the second common surface grinding step (S49), the grinding wheel rest 50 is moved back at a high speed to prevent the grinding wheel T from grinding the profile variation surface D1 of the first cam 12.

Figure 15:
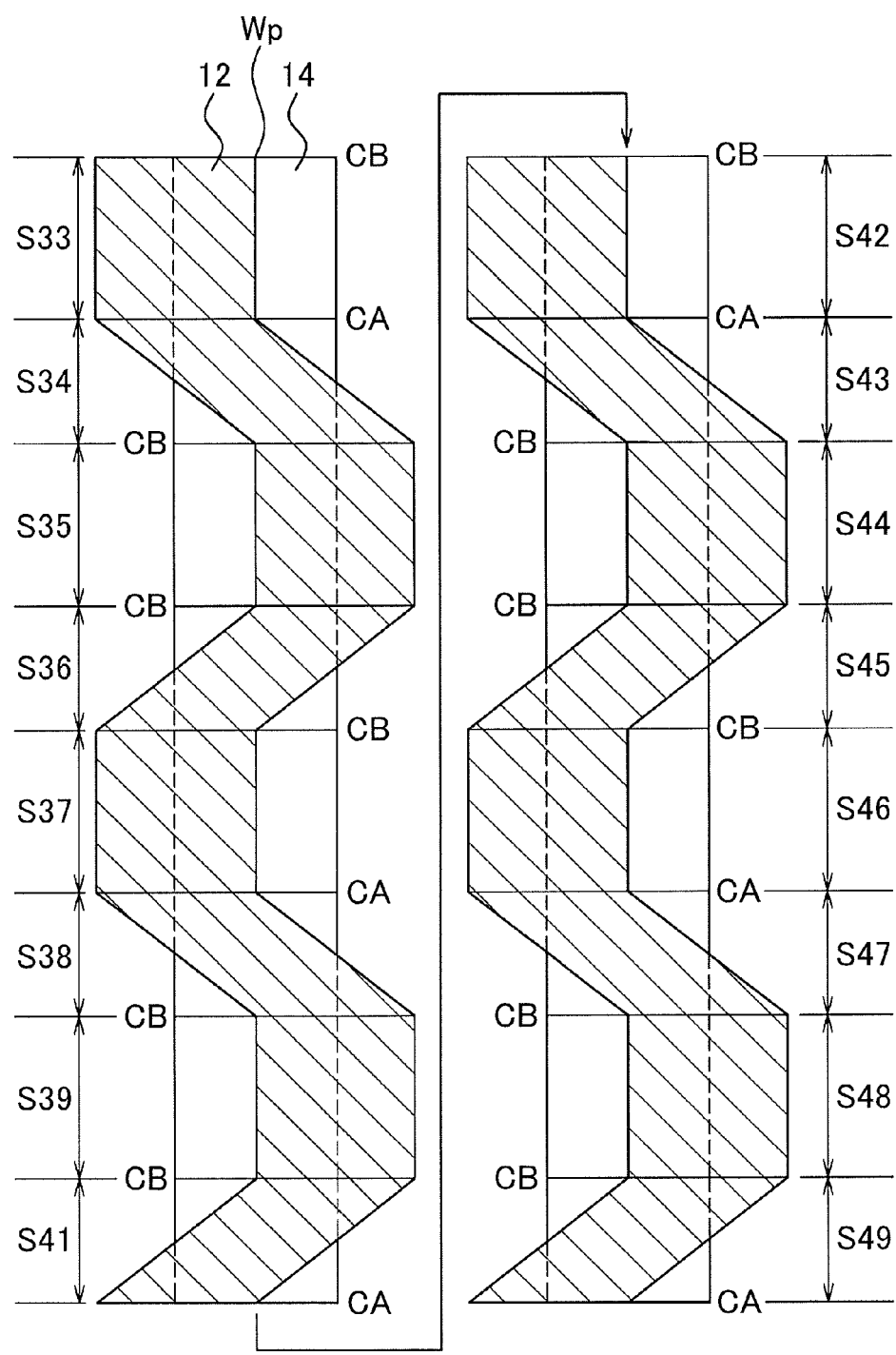
FIG. 15 is a development view illustrating a focus of a grinding wheel formed on a first cam and a second cam according to the second embodiment of the invention.

A locus of the grinding wheel T formed on the first cam 12 and the second cam 14 in the second embodiment will be described with reference to FIG. 15. FIG. 15 illustrates the outer periphery of each of the first cam 12 and the second cam 14 by developing it in a planar shape.

In the second embodiment, under the condition that the width Wa of the first cam 12 is equal to the width Wb of the second cam 14, the width Td of the grinding wheel T is set twice the width Wa. When an equation, Td=2×Wa=2×Wb, is satisfied, the left end Tf of the grinding wheel T passes through an intermediate position between the phase CA and the phase CB at the left end of the first cam 12 in step S34 described below, and passes through the intermediate position between the phase CA and the phase CB at the left end of the first cam 12 in step S36 described below. This enables the whole area of the common surface C to be ground in steps S34 and S36. When an expression, Td<2×Wa=2×Wb, is satisfied, an unground area is formed at the intermediate position between the phase CA and the phase CB at the left end of the first cam 12, and an unground area is formed at the intermediate position between the phase CA and the phase CB at the right end of the second cam 14. On the other hand, when an expression, Td>2×Wa=2×Wb, is satisfied, no idle grinding area is formed at the intermediate position between the phase CA and the phase CB at the left end of the first cam 12, as well as at the intermediate position between the phase CA and the phase CB at the right end of the second cam 14. However, the amount of traverse movement of the grinding wheel T with respect to the workpiece W increases in the first common surface grinding step and the second common surface grinding step. As a result, the traverse movement of the grinding wheel T may not he completed while the grinding wheel T rotates from the phase CA to the phase CB. In view of this, it is desirable that the width Td of the grinding wheel T is not excessively large.

In the first cam grinding step (fine grinding in the first rotation) (S33), the grinding wheel T is positioned on the first cam 12 from the phase CB to the phase CA. The right end Tg of the grinding wheel T is positioned on the boundary Wp between the first cam 12 and the second cam 14, and the grinding wheel T is advanced into the workpiece W by an amount corresponding to the advancing distance Jd, from the phase CB to the phase CA.

In the first common surface grinding step (fine grinding in the first rotation) (S34), the grinding wheel T is positioned on the common surface C from the phase CA to the phase CB. The grinding wheel T is positioned on the common surface C of the first cam 12 at the phase CA, and the grinding wheel T is positioned on the common surface C of the second cam 14 at the phase CB. As the grinding wheel T is moved from the phase CA to the phase CB, the grinding wheel T is moved rightward by an amount corresponding to the width Td of the grinding wheel T with respect to the workpiece W, thereby grinding the common surface C by an amount corresponding to the advancing distance Jd in step S33. In order to cause the grinding wheel T to start moving rightward with respect to the workpiece W when the grinding wheel T reaches the phase CA, and to cause the grinding wheel T to stop moving rightward with respect to the workpiece W when the grinding wheel T reaches the phase CB, a traverse speed Sd of the workpiece W needs to be set to an optimum value. The rotation speed Nd of the main spindle 74 is set in advance, and the traverse speed Sd of the workpiece W is calculated based on the rotation speed Nd, the width Td of the grinding wheel T, and an angle from the phase CA to the phase CB. The workpiece W is actually moved leftward with respect to the grinding wheel T at the traverse speed Sd acquired as described above.

In the second cam grinding step (fine grinding in the second rotation) (S35), the grinding wheel T is positioned on the second cam 14, from the phase CB to the phase CA. The left end Tf of the grinding wheel T is positioned on the boundary Wp between the first cam 12 and the second cam 14, and the second cam 14 is ground, through fine grinding, by an amount corresponding to the advancing distance Jd in step S33, from the phase CB to the phase CA.

In the second common surface grinding step (fine grinding in the second rotation) (S36), the grinding wheel T is positioned on the common surface C from the phase CA to the phase CB. The grinding wheel T is positioned on the common surface C of the second cam 14 at the phase CA, and the grinding wheel T is positioned on the common surface C of the first cam 12 at the phase CB. As the grinding wheel T is moved from the phase CA to the phase CB, the grinding wheel T is moved leftward by an amount corresponding to the width Td of the grinding wheel T with respect to the workpiece W, thereby grinding the common surface C by an amount corresponding to the advancing distance Jd in step S33. The workpiece W is actually moved rightward with respect to the grinding wheel T at the traverse speed Sd.

In the first cam grinding step (fine grinding in the third rotation) (S37), an operation similar to that in the first cam grinding step (fine grinding in the first rotation) (S33) is repeatedly performed. That is, the right end Tg of the grinding wheel T is positioned on the boundary Wp between the first cam 12 and the second cam 14, and the grinding wheel T is advanced into the workpiece W by an amount corresponding to the advancing distance Jd, from the phase CB to the phase CA.

In the first common surface grinding step (fine grinding in the third rotation) (S38), an operation similar to that in the first common surface grinding step (fine grinding in the first rotation) (S34) is repeatedly performed. That is, as the grinding wheel T is moved from the phase CA to the phase CB, the grinding wheel T is moved rightward by an amount corresponding to the width Td of the grinding wheel T with respect to the workpiece W. Then, the common surface C is ground, through fine grinding, by an amount corresponding to the advancing distance Jd in step S37.

In the second cam grinding step (fine grinding in the fourth rotation) (S39), an operation similar to that in the second cam grinding step (fine grinding in the second rotation) (S39) is repeatedly performed. That is, the left end Tf of the grinding wheel T is positioned on the boundary Wp between the first cam 12 and the second cam 14, and the second cam 14 is ground, through fine grinding, by an amount corresponding to the advancing distance Jd in step S37, from the phase CB to the phase CA.

In the second common surface grinding step (fine grinding in the fourth rotation) (S41), an operation similar to that in the second common surface grinding step (fine grinding in the second rotation) (S36) is repeatedly performed. That is, as the grinding wheel T is moved from the phase CA to the phase CB, the grinding wheel T is moved leftward by an amount corresponding to the width Td of the grinding wheel T with respect to the workpiece W, and the common surface C is ground, through fine grinding, by an amount corresponding to the advancing distance Jd in step S37.

In the first cam grinding step (spark-out in the first rotation) (S42), the grinding wheel T is positioned on the first cam 12 from the phase CB to the phase CA. The right end Tg of the grinding wheel T is positioned on the boundary Wp between the first cam 12 and the second cam 14, and the grinding wheel T is advanced into the workpiece W by an amount of recovery of deflection of the workpiece W while the advancing distance Je is set to zero, from the phase CB to the phase CA.

In the first common surface grinding step (spark-out in the first rotation) (S43), as the grinding wheel T is moved from the phase CA to the phase CB, the grinding wheel T is moved rightward by an amount corresponding to the width Td of the grinding wheel T with respect to the workpiece W. Then, the common surface C is ground by an amount corresponding to the recovery of deflection of the workpiece W. The rotation speed Ne of the main spindle 74 is set in advance, and the traverse speed Se of the workpiece W is calculated based on the rotation speed Ne, and an angle from the phase CA to the phase CB. The workpiece W is actually moved leftward with respect to the grinding wheel T at the traverse speed Se acquired as described above.

In the second cam grinding step (spark-out in the second rotation) (S44), the left end Tf of the grinding wheel T is positioned on the boundary Wp between the first cam 12 and the second cam 14, and the spark-out of the second cam 14 is performed from the phase CB to the phase CA by an amount corresponding to the recovery of deflection of the workpiece W.

In the second common surface grinding step (spark-out in the second rotation) (S45), as the grinding wheel T is moved from the phase CA to the phase CB, the grinding wheel T is moved leftward by an amount corresponding to the width Td of the grinding wheel T with respect to the workpiece W. The spark-out of the common surface C is performed by an amount corresponding to the recovery of deflection of the workpiece W. The workpiece W is actually moved leftward with respect to the grinding wheel T at the traverse speed Se.

The operations in the first cam grinding step (spark-out in the third rotation) (S46), the first common surface grinding step (spark-out in the third rotation) (S47), the second cam grinding step (spark-out in the fourth rotation) (S48), and the second common surface grinding step (spark-out in the fourth rotation) (S49) are the same as those in the first cam grinding step (spark-out in the first rotation) (S42), the first common surface grinding step (spark-out in the first rotation) (S43), the second cam grinding step (spark-out in the second rotation) (S44), and the second common surface grinding step (spark-out in the second rotation) (S45). Therefore, description of steps S46 to S49 will be omitted.

According to the present embodiment described above, the unground portions Wd, We at the boundary between the first cam 12 and the second cam 14, which are formed in the first cam grinding step (rough grinding) (S21), the first cam grinding step (precision grinding) (S22), the second cam grinding step (rough grinding) (S26), and the second cam grinding step (precision grinding) (S27), are removed in the first common surface grinding step (fine grinding in the first rotation) (S34). From step S35 to step S49 that are performed after step S34, grinding that causes formation of an unground portion at the boundary Wp on the common surface C is not performed. Thus, when the tappet 22 is relatively moved between the first cam 12 and the second cam 14, the tappet 22 does not climb over the unground portion Wd unlike in related art. Thus, the tappet 22 is smoothly moved between the first cam 12 and the second cam 14. As a result, truing of the grinding wheel does not need to be frequently performed.

While the fact that shear droop at the both end edges Ta, Tb on a grinding face side of the grinding wheel T causes formation of the unground portions Wd, We on the common surface C has been described, shear droop at the right end edge Tb causes formation of an unground portion on a portion (mainly the first profile variation surface D1) of the first cam 12 other than the common surface C, the portion being on the second cam 14-side. In addition, shear droop at the left end edge Ta causes formation of an unground portion (mainly a second profile variation surface D2) of the second cam 14 other than the common surface C, the portion being on first cam 12-side. Even when the unground portion is present on the boundary Wp in a portion other than the common surface C, there is no possibility that the tappet is brought into contact with the unground portion in the portion other than the common surface C because the tappet of the valve is moved through an intermediate position of the first cam 12 or the second cam 14 in the axial direction, in the portion other than the common surface C. To emphasize the unground portions Wd, We on the common surface C, an unground portion on the portion other than the common surface C is omitted in FIGS. 16 to 21.

Subsequently, the flow of the cam grinding process according to the first embodiment illustrated in FIG. 7 will be described. In the flow of the cam grinding process according to the first embodiment, the common surface setting step (S11), the positioning step (S12), and the idle grinding step (S13) are identical to those of the cam grinding process according to the second embodiment illustrated in FIG. 13 and FIG. 14, and therefore these steps will be denoted by the same step numbers as those in the second embodiment and detailed description thereof will be omitted. For easy understanding, the first cam grinding step (S14) and the first common surface grinding step (S15) are regarded as the fine grinding in the first rotation in the second embodiment, and the second cam grinding step (S16) and the second common surface grinding step (S17) are regarded as the fine grinding in the second rotation in the second embodiment.

In the first cam grinding step (S14), the grinding wheel T is rotated at the grinding wheel rotation speed Md, the main spindle 74 is rotated at the main spindle rotation speed Nd, and the grinding wheel T is advanced toward the workpiece W by an amount corresponding to the advancing distance Jd at the plunge speed Ud. In this way, the grinding of the first cam 12 from the phase CB to the phase CA is performed.

In the first common surface grinding step (S15), the rotation of the grinding wheel T at the grinding wheel rotation speed Md and the rotation of the main spindle 74 at the main spindle rotation speed Nd in step S14 are continued, and the workpiece table 65 is moved leftward by an amount corresponding to the width Td of the grinding wheel T. In this way, the grinding from the phase CA of the first cam 12 to the phase CA of the second cam 14 is performed. After the workpiece table 65 is moved leftward, the left end Tf of the grinding wheel T is aligned with the right end Tg of the first cam 12. That is, the second cam 14 is aligned with the grinding wheel T.

In the first cam grinding step (S14), the fine grinding of the first cam 12 from the phase CB to the phase CA is performed, and the fine grinding of the first cam 12 from the phase CA to the phase CB is not performed, so that no unground portion is formed at the boundary Wp on the common surface C. In the first common surface grinding step (S15), the fine grinding from the phase CA of the first cam 12 to the phase CB of the second cam 14 is performed across the boundary Wp, and thus no unground portion is formed at the boundary Wp on the common surface C.

The rotation of the grinding wheel T at the grinding wheel rotation speed Md and the rotation of the main spindle 74 at the main spindle rotation speed Nd in step S14 are continued. In this way, the grinding of the second cam 14 from the phase CB to the phase CA is performed.

In the second common surface grinding step (S17), the rotation of the grinding wheel T at the grinding wheel rotation speed Md and the rotation of the main spindle 74 at the main spindle rotation speed Nd in step S14 are continued, and the workpiece table 65 is moved rightward by an amount corresponding to the width Td of the grinding wheel T. In this way, the grinding from the phase CA of the second cam 14 to the phase CB of the first cam 12 is performed. After the workpiece table 65 is moved rightward, the right end Tg of the grinding wheel T is aligned with the left end Tf of the second cam 14. That is, the first cam 12 is aligned with the grinding wheel T.

In the second cam grinding step (S16), the fine grinding of the first cam 12 from the phase CB to the phase CA is performed, and the fine grinding of the first cam 12 from the phase CA to the phase CB is not performed, so that no unground portion is formed at the boundary Wp on the common surface C. In the second common surface grinding step (S17), the fine grinding from the phase CA of the first cam 12 to the phase CB of the second cam 14 is performed across the boundary Wp, and thus no unground portion is formed at the boundary Wp on the common surface C.

After the second common surface grinding step (S17), the grinding wheel rest 50 is moved back at s high speed to prevent the grinding wheel T from grinding the profile variation surface D1 of the first cam 12.

In the second embodiment described above, while the first common surface grinding step and the second common surface grinding step are performed in the fine grinding and the spark-out, the first common surface grinding step and the second common surface grinding step may be performed also in the rough grinding and the precision grinding. There is a following relationship: the rotation speed Nb of the main spindle 74 during rough grinding>the rotation speed Nc of the main spindle 74 during precision grinding>the rotation speed Nd of the main spindle 74 during fine grinding>the rotation speed Ne of the main spindle 74 during spark-out. Thus, when the rotation speed Nb is excessively high, the traverse speed S is also excessively high and the workpiece table driving device 66 serving as a traverse moving device is not able to follow the traverse speed S. Therefore, it is necessary to reduce the traverse speed by reducing the rotation speed Nb, thereby enabling the workpiece table driving device 66 to follow the traverse speed.

In the foregoing embodiments, the first cam 12 serves as a cam for low-speed use and the second cam 14 serves as a cam for high-speed use. Alternatively, the first cam 12 serves as a cam for high-speed use and the second cam 14 serves as a cam for low-speed use.

What is claimed is:

1. A cam grinding machine configured to grind a composite cam,
the composite cam including a first cam having a lift amount that varies, the lift amount being a distance from a rotation axis of the composite cam to an outer peripheral surface of the first cam, and a second cam having a lift amount that varies, the lift amount being a distance from the rotation axis of the composite cam to an outer peripheral surface of the second cam,
the first cam and the second cam being coaxially disposed adjacent to each other in an axial direction, and
the first cam and the second cam having shapes corresponding respectively to first cam lift data and second cam lift data that are different from each other,
the cam grinding machine comprising:
a bed;
a workpiece rotating device mounted on the bed, the workpiece rotating device being configured to control a phase of the composite cam about the rotation axis to rotationally drive the composite cam;
a grinding wheel device mounted on the bed, the grinding wheel device including a rotary grinding wheel;
a traverse moving device configured to control a position of the grinding wheel relative to the composite cam in the axial direction to perform traverse movement of the grinding wheel relative to the composite cam;
a plunge moving device configured to control a position of the grinding wheel relative to the composite cam in a direction intersecting with the axial direction to perform plunge movement of the grinding wheel relative to the composite cam; and
a controller configured to control the workpiece rotating device, the traverse moving device, and the plunge moving device, wherein
the controller includes:
a common surface setting unit configured to acquire and store a phase range of a common surface in which the lift amount of the first cam and the lift amount of the second cam are equal to each other, based on the first cam lift data in which the lift amount at each phase of the first cam is set and the second cam lift data in which the lift amount at each phase of the second cam is set;
a first cam grinding unit configured to control the workpiece rotating device and the plunge moving device to grind the first cam;
a first common surface grinding unit configured to control the workpiece rotating device and the traverse moving device to move the grinding wheel from a common surface of the first cam to the common surface of the second cam and to grind the common surface;
a second cam grinding unit configured to control the workpiece rotating device and the plunge moving device to grind the second cam;
a second common surface grinding unit configured to control the workpiece rotating device and the traverse moving device to move the grinding wheel from a common surface of the second cam to the common surface of the first cam and to grind the common surface; and an overall operation unit configured to set actuations such that the first cam grinding unit, the first common surface grinding unit, the second cam grinding unit, and the second common surface grinding unit are actuated in this order.

2. The cam grinding machine according to claim 1, wherein:

grinding of the first cam by the first cam grinding unit and grinding of the second cam by the second cam grinding unit each include rough grinding, precision grinding, fine grinding, and spark-out;

grinding of the common surface by the first common surface grinding unit and grinding of the common surface by the second common surface grinding unit each include fine grinding, and spark-out;

the overall operation unit is configured to actuate the first cam grinding unit and the second cam grinding unit such that the rough grinding of the first cam, the precision grinding of the first cam, the rough grinding of the second cam, and the precision grinding of the second cam are performed in this order; and the overall operation unit is configured to actuate the first cam grinding unit, the first common surface grinding unit, the second cam grinding unit, and the second common surface grinding unit such the fine grinding of the first cam, the fine grinding of the common surface by the first common surface grinding unit, the fine grinding of the second cam, the fine grinding of the common surface by the second common surface grinding unit, the spark-out of the first cam, the spark-out of the common surface by the first common surface grinding unit, the spark-out of the second cam, and the spark-out of the common surface by the second common surface grinding unit are performed in this order.

3. The cam grinding machine according to claim 2, wherein:

the fine grinding and the spark-out of each of the first cam, the second cam, the common surface by the first common surface grinding unit, and the common surface by the second common surface grinding unit, are performed by rotating the composite cam about the rotation axis multiple times; and the overall operation unit is configured to actuate the first cam grinding unit, the first common surface grinding unit, the second cam grinding unit, and the second common surface grinding unit such that the fine grinding is repeated in an order of the first cam, the common surface by the first common surface grinding unit, the second cam, and the common surface by the second common surface grinding unit, every two rotations of the composite cam, and such that the spark-out is repeated in an order of the first cam, the common surface by the first common surface grinding unit, the second cam, and the common surface by the second common surface grinding unit, every two rotations of the composite cam.

4. A cam grinding method for grinding a composite cam, the composite cam including a first cam having a lift amount that varies, the lift amount being a distance from a rotation axis of the composite cam to an outer peripheral surface of the first cam, and a second cam having a lift amount that varies, the lift amount being a distance from the rotation axis of the composite cam to an outer peripheral surface of the second cam, the first cam and the second cam being coaxially disposed adjacent to each other in an axial direction, and the first cam and the second cam having shapes corresponding respectively to first cam lift data and second cam lift data that are different from each other, cam grinding method comprising:

a common surface setting step of acquiring and storing a phase range of a common surface in which the lift amount of the first cam and the lift amount of the second cam are equal to each other, based on the first cam lift data in which the lift amount at each phase of the first cam is set and the second cam lift data in which the lift amount at each phase of the second cam is set;

a first cam grinding step of grinding the first cam through plunge grinding, using a grinding wheel, based on the first cam lift data;

a first common surface grinding step of moving the grinding wheel from a common surface of the first cam to the common surface of the second cam and grinding the common surface;

a second cam grinding step of grinding the second cam through plunge grinding, using the grinding wheel, based on the second cam lift data; and a second common surface grinding step of moving the grinding wheel from a common surface of the second cam to the common surface of the first cam and grinding the common surface; wherein the common surface setting step, the first cam grinding step, the first common surface grinding step, the second cam grinding step, and the second common surface grinding step are performed in this order.

5. The cam grinding method according to claim 4, wherein:

the first cam grinding step and the second cam grinding step each include rough grinding, precision grinding, fine grinding, and spark-out;

the first common surface grinding step and the second common surface grinding step each include fine grinding, and spark-out;

in the cam grinding method, the rough grinding of the first cam, the precision grinding of the first cam, the rough grinding of the second cam, and the precision grinding of the second cam are performed in this order; and the fine grinding in the first cam grinding step, the fine grinding in the first common surface grinding step, the fine grinding in the second cam grinding step, the fine grinding in the second common surface grinding step, the spark-out in the first cam grinding step, the spark-out in the first common surface grinding step, the spark-out in the second cam grinding step, and the spark-out in the second common surface grinding step are performed in this order.

6. The cam grinding method according to claim 5, wherein:

the fine grinding and the spark-out in each of the first cam grinding step, the second cam grinding step, the first common surface grinding step, and the second common surface grinding step are performed by rotating the composite cam about the rotation axis multiple times; and the fine grinding is repeated in an order of the first cam grinding step, the first common surface grinding step, the second cam grinding step, and the second common surface grinding step every two rotations of the composite cam, and the spark-out is repeated in an order of the first cam grinding step, the first common surface grinding step, the second cam grinding step, and the second common surface grinding step every two rotations of the composite cam.

* * * * *